United States Patent [19]

Makino et al.

[11] Patent Number: 5,270,851
[45] Date of Patent: Dec. 14, 1993

[54] ACHROMATIC-TYPE LASER SCANNING OPTICAL SYSTEM

[75] Inventors: Jun Makino; Jun Koide, both of Yokohama, Japan

[73] Assignee: Canon Kabushiki Kaisha, Tokyo, Japan

[21] Appl. No.: 921,403

[22] Filed: Jul. 30, 1992

Related U.S. Application Data

[63] Continuation of Ser. No. 663,370, Mar. 1, 1991, abandoned, which is a continuation of Ser. No. 458,545, Dec. 28, 1989, abandoned.

[30] Foreign Application Priority Data

Jan. 9, 1989 [JP] Japan .................. 1-002258
Aug. 4, 1989 [JP] Japan .................. 1-202386
Nov. 13, 1989 [JP] Japan .................. 1-294192

[51] Int. Cl.$^5$ ............................. G02B 26/08
[52] U.S. Cl. .................... 359/206; 359/216; 359/662; 359/710; 346/108
[58] Field of Search ................ 350/6.1, 6.7, 6.8; 250/236; 359/197, 201, 205–206, 209, 210, 216, 217, 662, 710; 346/108

[56] References Cited

U.S. PATENT DOCUMENTS

| | | | |
|---|---|---|---|
| 3,825,856 | 7/1974 | Pezot | 331/94.5 |
| 4,165,149 | 8/1979 | Suzki et al. | 350/6.1 |
| 4,179,183 | 12/1979 | Tateoka et al. | 350/6.1 |
| 4,226,500 | 10/1980 | Minoura et al. | 350/6.1 |
| 4,712,884 | 12/1987 | Sakuma et al. | 350/6.8 |
| 4,715,699 | 12/1987 | Morimoto | 350/6.8 |
| 4,756,583 | 7/1988 | Morimoto | 350/6.5 |
| 4,756,584 | 7/1988 | Takanashi | 350/6.8 |
| 4,909,616 | 3/1990 | Arai | 346/108 |
| 4,932,734 | 6/1990 | Sakuma et al. | 350/6.8 |
| 4,950,889 | 8/1990 | Budd et al. | 250/236 |
| 5,054,866 | 10/1991 | Tomita et al. | 359/210 |

FOREIGN PATENT DOCUMENTS 0121033 10/1984 European Pat. Off. .
3703679 8/1987 Fed. Rep. of Germany .

Primary Examiner—Bruce Y. Arnold
Assistant Examiner—James Phan
Attorney, Agent, or Firm—Fitzpatrick, Cella, Harper & Scinto

[57] ABSTRACT

An achromatic-type scanning optical arrangement includes a laser source, a first optical system for converging a beam of light emanating from the laser source, a deflecting device for deflecting the beam of light converged by the first optical system and a second optical system for focusing the beam of light deflected by the deflecting device onto a predetermined position. The entire optical system including the first optical system and the second optical system is corrected for chromatic aberration, as a whole, to eliminate the adverse influence of wavelength variations in the laser source upon variations in the focus position of the aforesaid beam of light.

26 Claims, 18 Drawing Sheets

CURVATURE OF THE FIELD
BY SCANNING BEAM WAIST
(SCAN DIRECTION)

CURVATURE OF THE FIELD
BY SCANNING BEAM WAIST
(SUB-SCAN DIRECTION)

ACHROMATIC-TYPE LASER SCANNING OPTICAL SYSTEM

This application is a continuation of prior application, Ser. No. 07/663,370 filed Mar. 1, 1991, which application is a continuation of prior application, Ser. No. 07/458,545 filed Dec. 28, 1989, both now abandoned.

BACKGROUND OF THE INVENTION

1. Field of the Invention

The present invention generally relates to laser scanning optical systems and, more particularly, to an achromatic-type laser scanning optical system for producing a high-resolution scanning image by means of a light source, such as a semiconductor laser or the like.

2. Description of the Related Art

A conventional type of laser scanning optical system is commonly arranged as shown in FIG. 1. A beam of laser light emanating from a semiconductor laser 1 is collimated by a collimator lens 2 and the collimated laser beam is focused on a reflecting surface 4a of a deflecting mirror 4 in linear form by a cylindrical lens 3. The cylindrical lens 3 has power in the sub-scan direction only (i.e., the direction perpendicular to the main-scan plane formed by a scanning beam during a scanning operation, or the direction parallel to the plane of the drawing of FIG. 1). Thereafter, the laser beam deflected by the deflecting mirror 4 is converged by a scanning lens assembly (f·θ lens assembly) 5 so that a beam spot is projected on a photosensitive drum 6.

In general, the wavelength of oscillating light emanating from such a semiconductor laser tends to vary within a small wavelength bandwidth due to various factors such as temperature changes. For example, in a semiconductor laser of wavelength 780 nm, a wavelength variation of approximately ±20 nm occurs within a temperature range of −40° C. to +60° C. The position of the image plane formed by the laser scanning optical system also varies due to such wavelength variation.

A scanning optical system of the high-resolution type generally has a small f number (35 or less) so that it can form a micro beam spot. Accordingly, its focal depth, that is, a focal range within which a satisfactory beam spot can be produced, is extremely limited. As a result, if the image plane is varied in position as described above, the surface of the photosensitive drum may deviate from the satisfactory range of the focal depth and no beam spot of the required high resolution may be produced.

To cope with this problem, a number of approaches have already been proposed. A first known approach is to correct the chromatic aberration of a collimator lens so that the light beam transmitted through the collimator lens is consistently held as a parallel beam irrespective of the presence or absence of wavelength variation. A second known approach is to appropriately select the material of a lens barrel for accommodating a collimator lens so that physical variations in the lens barrel due to temperature changes cancel variations in the focal length of the collimator lens due to wavelength variations. The second known approach is also intended to consistently keep the light beam transmitted through the collimator lens as a parallel beam irrespective of the presence or absence of wavelength variation. A third known approach is to install a detector for detecting the position of the image plane in a laser scanning optical system and a movable device for adjusting the position of the image plane. In the third approach, the movable device is driven in accordance with a signal supplied from the detector to adjust the position of the image plane so that the image plane is consistently held in an optimum position. A fourth known approach is to install a device for keeping a semiconductor laser warm at a constant temperature to prevent wavelength variations in the semiconductor laser.

However, any of the above-described known approaches involves a number of problems.

In each of the first and second approaches, the chromatic aberration of the scanning lens assembly (f·θ lens assembly) is not taken into account. Accordingly, even if the collimator lens forms a parallel beam of light, the position of the image plane will vary due to the chromatic aberration of the scanning lens assembly itself. This is because the variation in the position of the image plane due to wavelength variation is not corrected by taking into account the entire optical system including the collimator lens and the scanning lens assembly. Particularly when a lens element made of optical glass with a high refractive index is incorporated in the scanning lens assembly, the dispersion of the optical glass used for the scanning lens assembly generally increases. As a result, the variation in the position of the image plane due to the chromatic aberration of the scanning lens assembly increases.

A certain scanning lens assembly is considered which has the numerical data shown in Table 1, a focal length f of 170.4 mm, and an optical arrangement such as that shown in FIG. 2. If the scanning lens assembly is used in combination with the collimator lens explained in connection with the first known approach, the resulting variation in the position of the image plane is as shown in FIG. 3. The scanning lens assembly can produce a satisfactory beam spot (a beam spot of 50 μm in diameter with a semiconductor laser of wavelength 780 μm) within a focal depth of ±1 mm, but the illustrated variation in the position of the image plane ranges over ±0.8 nm. For this reason, in the above known optical arrangement, it is necessary that each lens element of the scanning lens assembly be produced so that the positional accuracy of the entire scanning optical system with respect to the photosensitive drum 6 can be kept within ±0.2 mm. As a result, extremely strict working accuracy is required and the manufacturing cost thereof increases.

TABLE 1

| (Data on Scanning Lens Assembly 5) | | |
| --- | --- | --- |
| $R_1 = -31.905$ | $D_1 = 4.70$ | $N_1 = 1.51072$ |
| $R_2 = -156.190$ | $D_2 = 2.095$ | $N_2 = 1$ |
| $R_3 = -107.660$ | $D_3 = 16.7$ | $N_3 = 1.76591$ |
| $R_4 = -52.701$ | $D_4 = 1.0$ | $N_4 = 1$ |
| $R_5(*1) = \infty$ | $D_5 = 16.1$ | $N_5 = 1.78569$ |
| $R_6(*1) = -131.56$ | | |
| $f = 170.4$ mm | field angle = ±37.5° | |
| $f_{NO.} = 4$ | wavelength = 780 nm | |

(*1) represents a toric lens, and the values of $R_5$ and $R_6$ with respect to the sub-scan direction are as follows:
$R_5 = -157.46$
$R_6 = -38.208$ In Table 1, Ri represents the radius of curvature of the ith lens surface as viewed from the light-source side, Di represents the distance between the ith lens surface and the (i+1)th lens surface, and Ni represents the refractive index of a medium located at the rear of the ith lens surface. In FIG. 2, the right-hand side corresponds to the side on which the photosensitive drum 6 is located.

The third known approach has the advantage that it is possible to always accurately determine the position of an image plane. However, both the detector and the movable device are complicated in structure and the manufacturing cost of the entire apparatus therefore increases.

The fourth known approach is disadvantageous in that a means for detecting and controlling the temperature of the semiconductor laser is needed, in that a relatively long time is required until the temperature of the semiconductor laser reaches a predetermined temperature, and in that, if the apparatus is designed so that it can operate in various operational environments which involve, for example, a wide range of temperature changes, the apparatus will become expensive.

SUMMARY OF THE INVENTION

It is, therefore, an object of the present invention to provide an achromatic-type laser scanning optical system which is arranged to reduce the influence of wavelength variations in a laser upon the resolution of a scan image by taking into account the entire optical system which constitutes the laser scanning optical system and without the need to make the scanning optical system complicated or expensive.

To achieve the above object, in accordance with the present invention, there is provided an achromatic-type laser scanning optical system which is arranged so that the influence of a plurality of optical elements, which constitute the entire optical system, upon variations in the position of an image plane can be reduced as far as possible by taking into account the plurality of optical elements as a whole.

In order to reduce variations in the position of the image plane due to wavelength variations, the achromatic-type scanning optical system according to the present invention is, in one preferred form, optically corrected so that the chromatic aberration of a collimator lens arrangement is opposite in characteristics to those of a scanning lens arrangement. In another preferred form of the achromatic-type scanning optical system according to the present invention, the collimator lens arrangement may be overcorrected for chromatic aberration.

Further objects, features and advantages of the present invention will become apparent from the following detailed description of various embodiments of the present invention with reference to the accompanying drawings.

DESCRIPTION OF THE PREFERRED EMBODIMENTS

Embodiments of the present invention will be explained below in detail with reference to the accompanying drawings.

Figure 1:
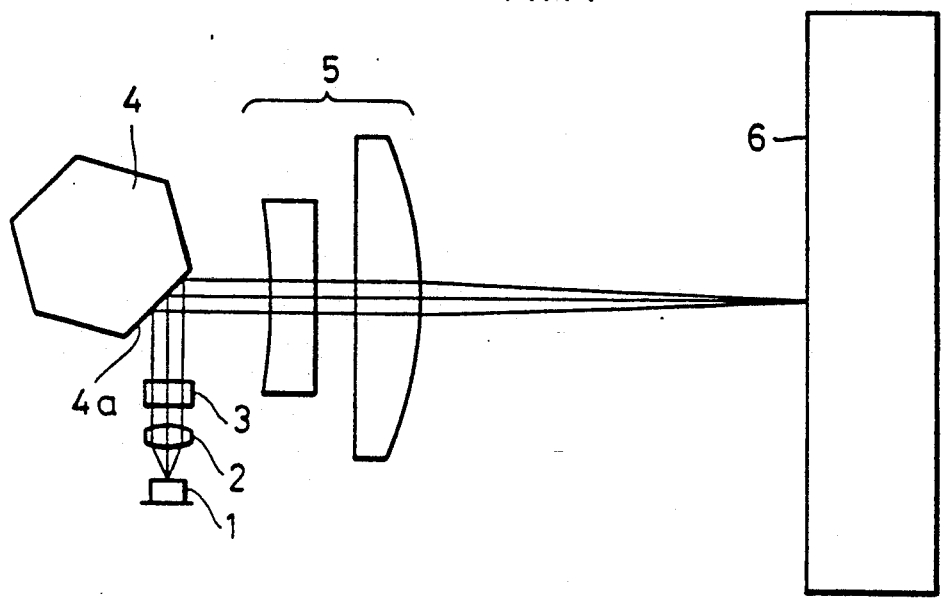
FIG. 1 is a schematic view which serves to illustrate a conventional type of laser scanning optical system.

Initially, explanation is given of laser scanning optical systems according to the first through fifth embodiments of the invention, each of which is capable of correcting the displacement of the image plane due to wavelength variations in the main-scan plane (i.e, a plane which is scanned sequentially in time by a beam of light deflected by a deflector, or a plane parallel to the plane of the drawing of FIG. 1).

The laser scanning optical system capable of correcting the displacement of the image plane due to wavelength variations in the main-scan plane can be most easily implemented by modifying an optical arrangement serving as a collimator lens.

Figure 4:
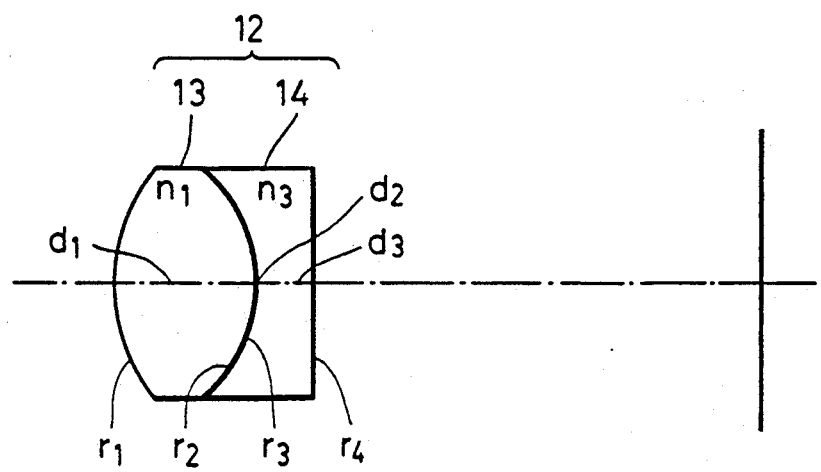
FIG. 4 is a schematic view showing a collimator lens assembly according to a first embodiment of the present invention.

FIG. 4 shows a collimator lens assembly 12 according to the first embodiment of the present invention, and the left-hand side of the figure corresponds to a laser-source side. The collimator lens assembly 12 with a positive power as a whole has a compact construction consisting of a convex lens element 13 and a concave lens element 14. The convex lens element 13 is made of low-dispersion glass, while the concave lens element 14 is made of high-dispersion glass. The collimator lens assembly 12 as a whole is overcorrected for chromatic aberration compared to a single collimator lens of the same focal length.

The meaning of the term "overcorrect(ion)" is explained with reference to a convex lens made of glass. When the convex lens is not corrected for chromatic aberration, and if the wavelength of light transmitted through the lens is long, the focal length of the lens is long. When the convex lens is corrected for chromatic aberration, even if the wavelength of transmitted light is long, the focal length does not change. When the convex lens is overcorrected for chromatic aberration, and if the wavelength of transmitted light is long, the focal distance is short.

As described above, the collimator lens assembly 12 as a whole is overcorrected for chromatic aberration. Accordingly, the collimator lens assembly 12 has chromatic aberration opposite to the chromatic aberration of the scanning lens assembly 5 which has been explained in connection with Table 1.

Figure 5:
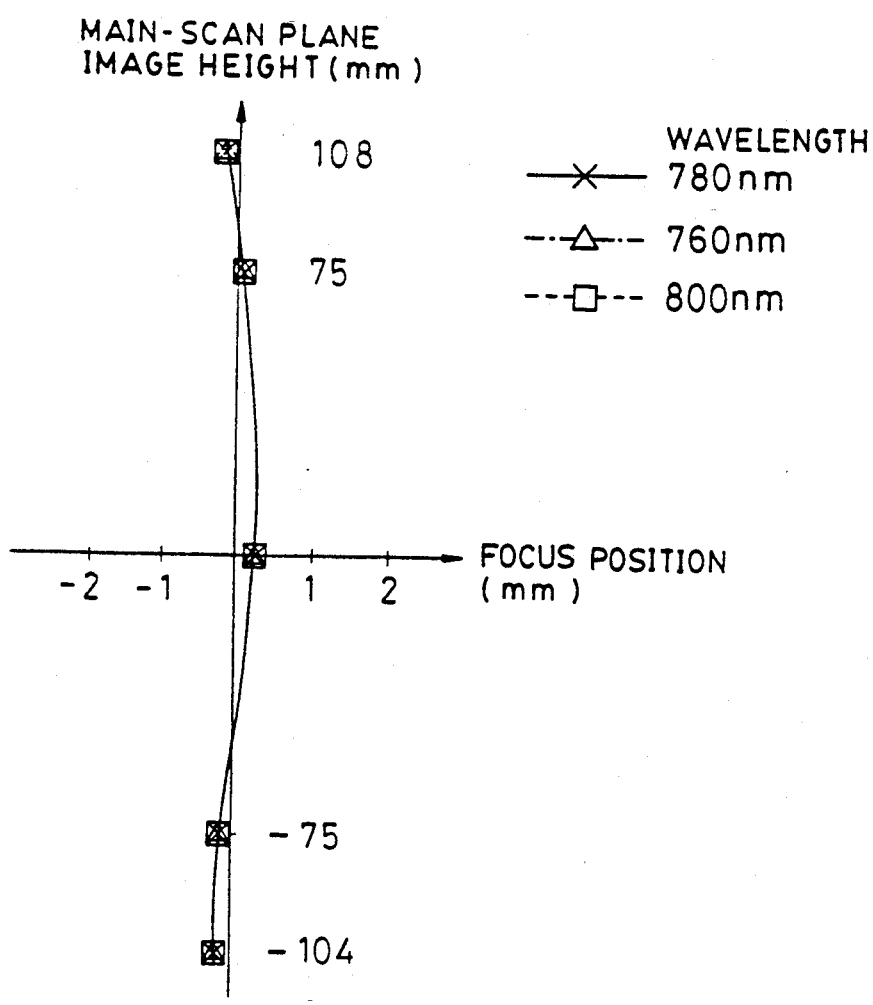
FIG. 5 is a diagram showing variations in the position of the image plane in the main-scan plane in the first embodiment.

Table 2 shows the design values which are used in designing the collimator lens assembly 12 having the above-described construction in combination with the scanning lens assembly 5 of Table 1. FIG. 5 shows the variation in the position of an image plane which is caused in the main-scan plane by wavelength variations in the first embodiment. As can be seen from FIG. 5, in the first embodiment, the variation in the position of the image plane in the main-scan plane is negligibly small.

TABLE 2

| (First Embodiment) | | |
| --- | --- | --- |
| $r_1 = 6.7786$ | $d_1 = 5.0$ | $n_1 = 1.51072$ |
| $r_2 = -4.97476$ | $d_2 = 0.1$ | $n_2 = 1$ |
| $r_3 = -4.97103$ | $d_3 = 2.0$ | $n_3 = 1.765910$ |
| $r_4 = 6.77860$ | | |
| $f = 23.2$ mm | | |
| $f_{NO.} = 4$ | | |
| wavelength = 780 nm | | |

In the first embodiment, if a satisfactory spot diameter is to be consistently formed on the photosensitive drum 6, it is sufficient to arrange each lens element of the collimator lens assembly 12 so that the position of the entire scanning optical system can be located within a positional accuracy of ±1 mm with respect to the photosensitive drum 6. Accordingly, it is possible to easily produce the collimator lens assembly 12.

In Table 2, as well as in Tables 3 through 7, which will be discussed later, ri represents the radius of the curvature of the ith lens surface as viewed from the light-source side, di represents the distance between the ith lens surface and the (i+1)th lens surface, and ni represents the refractive index of a medium located at the rear of the ith lens surface.

Ideally, it is desirable that the influence of wavelength variations on variations in the position of the image plane be suppressed as far as possible. However, if the positional accuracy with which the photosensitive drum 6 is mounted is taken into account, it is sufficient that the variation in the position of the image plane in the main-scan plane due to wavelength variations be kept within half the focal depth which is necessary to form the required spot diameter.

In the first embodiment, the variation in the position of the image plane in the main-scan plane due to a wavelength variation of ±20 82 m is kept within half the focal depth (±1 mm) that is necessary to produce the required spot (50 μm in diameter), that is, within ±0.5 mm.

Figure 6:
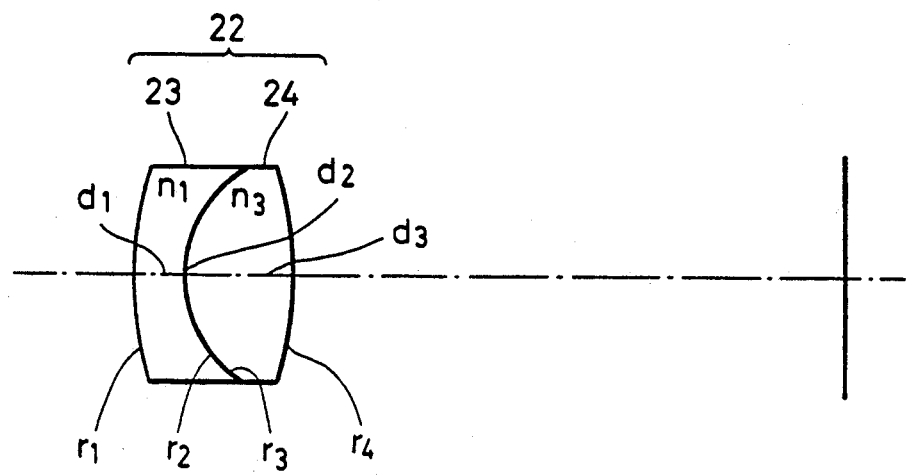
FIG. 6 is a schematic view showing a collimator lens assembly according to a second embodiment of the present invention.

FIG. 6 shows a collimator lens assembly 22 according to the second embodiment of the present invention, and the left-hand side of the figure corresponds to a laser-source side. The collimator lens assembly 22 has a compact construction consisting of a concave lens element 23 and a convex lens element 24, and these lens elements 23 and 24 are aligned in the order shown from the laser-source side. In the second embodiment, the concave lens element 23 is made of high-dispersion glass, while the convex lens element 24 is made of low-dispersion glass. As in the first embodiment, the collimator lens assembly 22 as a whole is overcorrected for chromatic aberration compared to a single collimator lens assembly of the same focal length.

Table 3 shows the design values which are used in designing the collimator lens assembly 22 in combination with the scanning lens assembly 5 of Table 1.

TABLE 3

| (Second Embodiment) | | |
| --- | --- | --- |
| $r_1 = 13.67882$ | $d_1 = 2.0$ | $n_1 = 1.765910$ |
| $r_2 = 5.13529$ | $d_2 = 0.1$ | $n_2 = 1$ |
| $r_3 = 5.04872$ | $d_3 = 4.0$ | $n_3 = 1.51072$ |
| $r_4 = -14.94824$ | | |
| $f = 23.2$ mm | | |
| $f_{NO.} = 4$ | | |

TABLE 3-continued (Second Embodiment)

wavelength = 780 nm

Figure 7:
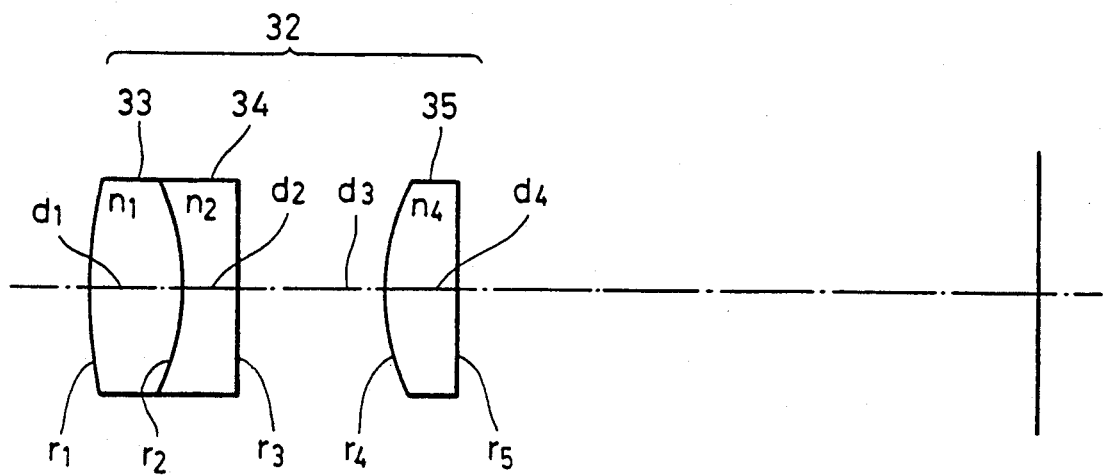
FIG. 7 is a schematic view showing a collimator lens assembly according to a third embodiment of the present invention.

FIG. 7 shows a collimator lens assembly 32 according to the third embodiment of the present invention, and the left-hand side of the figure corresponds to a laser-source side. The collimator lens assembly 32 consists of a convex lens element 33, a concave lens element 34 and a concave lens element 35, and these lens elements 33, 34 and 35 are aligned in the order shown from the laser-source side. The two convex lens elements 33 and 35 are made of low-dispersion glass, while the concave lens element 34 is made of high-dispersion glass. The collimator lens assembly 32 as a whole is overcorrected for chromatic aberration. The convex lens element 33 and the concave lens element 34 are cemented as one doublet, and the absolute value of the power of this cemented doublet is selected to be smaller than the absolute value of the power of the convex lens element 34 itself.

As described above, the third embodiment employs three lens elements. Accordingly, as compared to an arrangement consisting of two lens elements such as those explained in connection with FIGS. 4 and 6, correction for spherical aberration is improved. The cemented doublet consisting of the lens elements 33 and 34 may be shifted along the optical axis of the collimator lens assembly 32 so as to arbitrarily adjust the position of the image plane. In particular, since the absolute value of the power of the cemented doublet is selected as described above, it is possible to easily adjust the position of the image plane.

Table 4 shows the design values which are used in designing the collimator lens assembly 32 having the above-described construction in combination with the scanning lens assembly 5 of Table 1.

TABLE 4

(Third Embodiment)

| | | |
|---|---|---|
| $r_1 = 28.51710$ | $d_1 = 3.5$ | $n_1 = 1.51072$ |
| $r_2 = -8.63467$ | $d_2 = 2.0$ | $n_2 = 1.76591$ |
| $r_3 = -157.46165$ | $d_3 = 5.5$ | $n_3 = 1$ |
| $r_4 = 9.62597$ | $d_4 = 2.5$ | $n_4 = 1.51720$ |
| $r_5 = 108.59023$ | | |
| $f = 23.2$ mm | | |
| $f_{NO.} = 4$ | | |
| wavelength = 780 nm | | |

Figure 8:
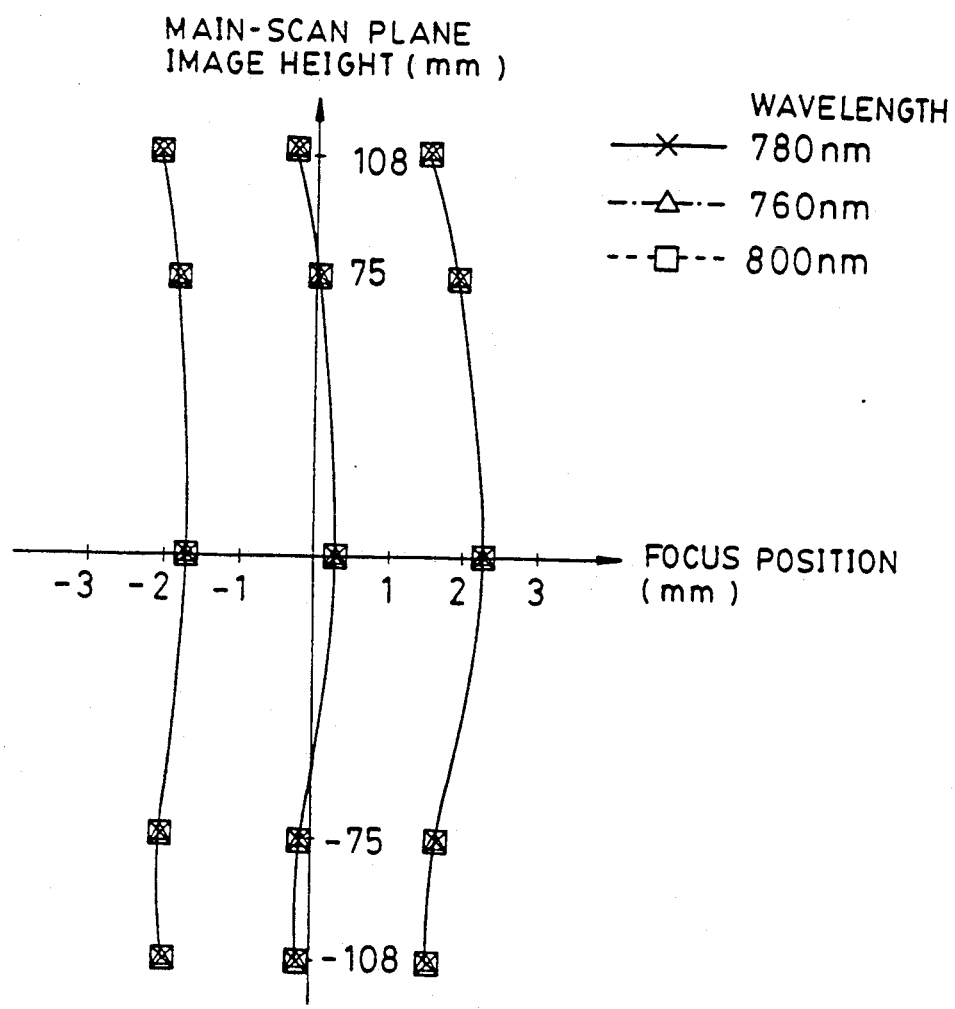
FIG. 8 is a diagram showing variations in the position of the image plane in the main-scan plane in the third embodiment.

FIG. 8 serves to illustrate the manner of adjusting the position of the image plane in the main-scan plane when the cemented doublet consisting of the lens elements 33 and 34 is shifted along the optical axis of the collimator lens assembly 32 as well as to illustrate variations in the position of the image plane due to wavelength variations at each adjustment position.

In the third embodiment, even if the scanning optical system is positioned with respect to the photosensitive drum 6 at a positional accuracy exceeding ±1 mm, it is possible to adjust the position of the image plane by shifting the cemented doublet consisting of the lens elements 33 and 34 along the optical axis. In addition, even if the position of the image plane is shifted due to a variation in the accuracy with which the scanning lens assembly 5 is produced, it is possible to adjust the position of the image plane so that the surface of the photosensitive drum 6 is accommodated within the focal depth. Moreover, as can be seen from FIG. 8, in the third embodiment, it is possible to neglect any variation in the position of the image plane due to wavelength variation in a semiconductor laser. Accordingly, the aforesaid adjustment can be easily performed.

Figure 9:
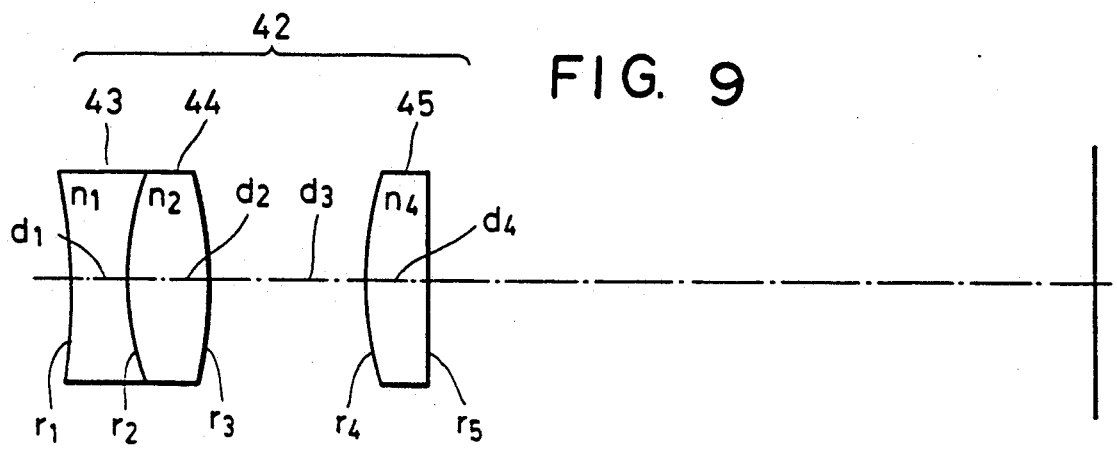
FIG. 9 is a schematic view showing a collimator lens assembly according to a fourth embodiment of the present invention.

FIG. 9 shows a collimator lens assembly 42 according to the fourth embodiment of the present invention, and the left-hand side of the figure corresponds to a laser-source side. The collimator lens assembly 42 is similar in construction to the collimator lens assembly 32 of the third embodiment, except that the collimator lens assembly 42 consists of a concave lens element 43, a convex lens assembly 44 and a convex lens element 45 which are aligned in the order shown from the laser-source side. Table 5 shows the design values which are used in designing the collimator lens assembly 42 having the above-described construction in combination with the scanning lens assembly 5 of Table 1.

TABLE 5

(Fourth Embodiment)

| | | |
|---|---|---|
| $r_1 = -35.31018$ | $d_1 = 2.17$ | $n_1 = 1.76591$ |
| $r_2 = 12.803$ | $d_2 = 3.05$ | $n_2 = 1.51072$ |
| $r_3 = -15.26305$ | $d_3 = 5.99$ | $n_3 = 1$ |
| $r_4 = 14.23162$ | $d_4 = 2.36$ | $n_4 = 1.51072$ |
| $r_5 = -78.34661$ | | |
| $f = 23.2$ mm | | |
| $f_{NO.} = 4$ | | |
| wavelength = 780 nm | | |

Figure 10:
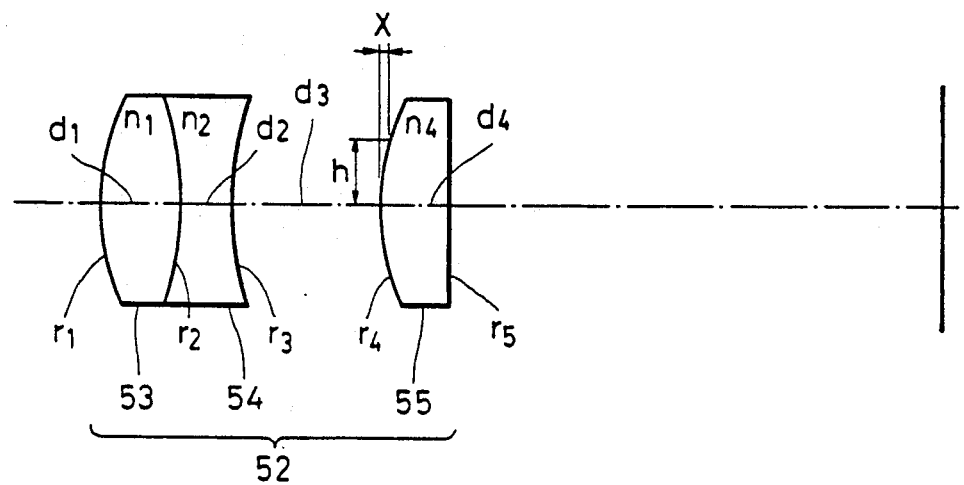
FIG. 10 is a schematic view showing a collimator lens assembly according to a fifth embodiment of the present invention.

FIG. 10 shows a collimator lens assembly 52 according to the fifth embodiment of the present invention, and the right-hand side of the figure corresponds to a laser-source side. The collimator lens assembly 52 is similar in construction to the collimator lens assembly 32 of the third embodiment in that the collimator lens assembly 52 consists of a convex lens element 53, a concave lens element 54 and a convex lens element 55 which are aligned in that order from the laser-source side. However, the second convex lens element 55 is made from an aspherical lens. Accordingly, it is possible to achieve even better correction of spherical aberration. The other features and advantages of the fifth embodiment are substantially the same as those of the third embodiment.

Table 6 shows the design values which are used in designing the collimator lens assembly 52 having the above-described construction in combination with the scanning lens assembly 5 of Table 1.

TABLE 6

(Fifth Embodiment)

| | | |
|---|---|---|
| r1 = 9.37369 | d1 = 3.0 | n1 = 1.51072 |
| r2 = −17.52189 | d2 = 2.0 | n2 = 1.76591 |
| r3 = 12.84291 | d3 = 6.0 | n3 = 1 |
| r4 = aspherical (*1) | d4 = 2.5 | n4 = 1.57645 |
| r5 = ∞ | | |
| f = 23.2 mm | | |
| fNO. = 4 | | |
| wavelength = 780 nm | | |

(*1) Aspherical data is given by $$X = \frac{h^2/R}{1 + \sqrt{1 - (h/R)^2}} + Ah^2 + Bh^4$$

(X: the deviation of the spherical surface, and h: the distance from the optical axis) where $R = 11.8399$, $A = 7.97920 \times 10^{-3}$ and $B = -4.05317 \times 10^{-5}$ As explained above, any of the embodiments described above utilizes the construction in which the collimator lens assembly as a whole is corrected to have chromatic aberration opposite to that of the scanning lens assembly or in which the collimator lens assembly as a whole is overcorrected for chromatic aberration.

Accordingly, the variation in position of the image plane in the main-scan plane due to variation in the wavelength of laser light can be made negligibly small. Consequently, even if the wavelength of light emitted from a laser varies due to a temperature change or any other factor, it is possible to consistently maintain an accurate spot diameter on the light receiving surface of the photosensitive drum.

In addition, since the variation in position of the image plane in the main-scan plane due to wavelength variations can be neglected, the substantial focal depth of the image plane can be widely rendered. Accordingly, it is possible to relax the accuracy with which each lens element of the scanning optical system are produced, thereby enabling a reduction in the manufacturing cost.

As described above, variations in the position of the image plane in the main-scan plane due to wavelength variations in the laser source are corrected by taking into account the entire optical system including the collimator lens assembly and the scanning lens assembly. Accordingly, it is possible to sufficiently correct the variation in the position of the image plane.

As is apparent from the foregoing, variations in the position of the image plane due to wavelength variations in the laser source are corrected by taking into account the entire optical system including the collimator lens assembly and the scanning lens assembly merely by applying modifications to the arrangement of the collimator lens assembly itself without making any special alterations in a conventional type of scanning lens assembly.

In the foregoing description, it has been stated that variations in the position of the image plane in the main-scan plane due to wavelength variations in the laser can be suppressed by modifying the collimator lens assembly.

However, a different problem is encountered with an inclination correcting optical system which has the scanning lens assembly 5 including an anamorphic optical system such as a toric lens or the like. As is known, the inclination correcting optical system is arranged so that, even if a deflecting reflection plane such as a polygon mirror serving as a deflector inclines to some extent, a scanning beam of light can be focused on an object along the same scanning line. In such an inclination correcting optical system, a main-scan plane and a sub-scan plane (a plane which includes the optical axis of the lens system and which is perpendicular to the main-scan plane) differ in chromatic aberration. It follows, therefore, that the chromatic aberration in neither plane is compatibly eliminated.

TABLE 7

| $r\perp_5 = 55.22$ | $r\|_5 = \infty$ | $d_5 = 7.00$ |
|---|---|---|
| $n_1 = 1.76591$ | | |
| wavelength = 780 nm | | |

In Table 7, "$r\perp$" represents the radius of curvature in the sub-scan plane, while "$r\|$" represents the radius of curvature in the main-scan plane.

In FIG. 10, associated with Table 7, the left-hand side corresponds to a laser-source side.

Figure 11:
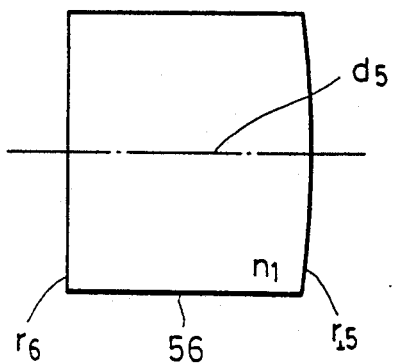
FIG. 11 is a schematic view showing one example of a cylindrical lens.
Figure 12:
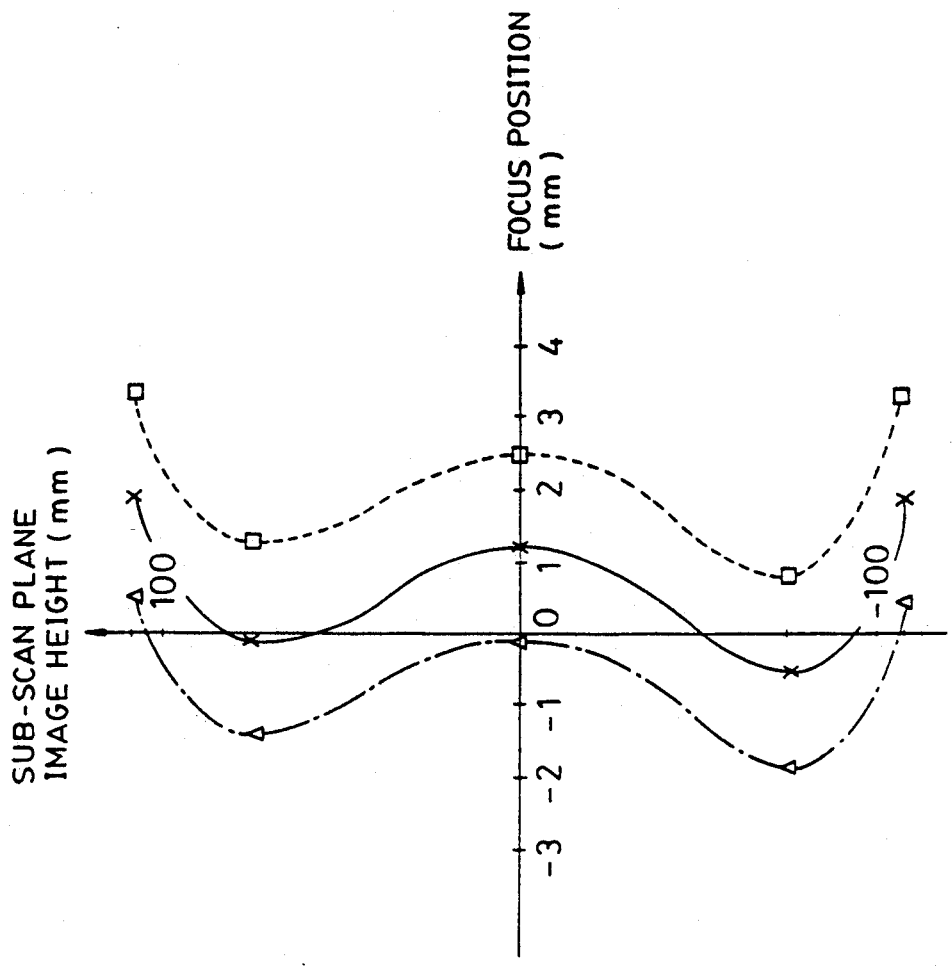
FIG. 12(a) is a diagram showing variations in the image plane in the main-scan plane due to wavelength variations when any of the above embodiments is employed.
FIG. 12(b) is a diagram showing variations in the image plane in the sub-scan plane due to wavelength variations when any of the above embodiments is employed.
Figure 12:
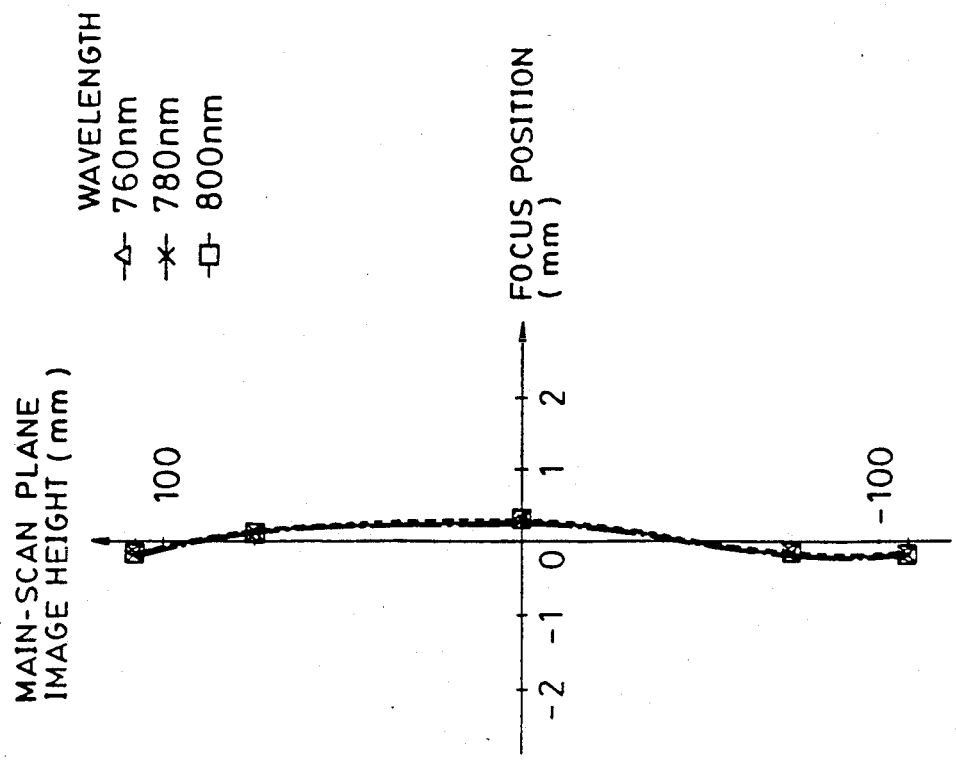

For example, the scanning lens assembly 5 of Table 1 (refer to FIG. 2) may be combined with a cylindrical lens 56 (refer to FIG. 11) which consists of a single lens element whose numerical data is shown in Table 7, and a collimator lens assembly, which is illustrated in Table 10 and FIG. 15(a), both of which will be discussed later, may be employed. In this arrangement, variations in the position of the image plane in each of the main-scan plane and the sub-scan plane are as shown in FIGS. 12(a) and 12(b). It will be understood that, although no substantial displacement of the image plane is observed in the main-scan plane (refer to FIG. 12(a)), the displacement of the image plane in the sub-scan plane is not sufficiently corrected (refer to FIG. 12(b)).

The following is an explanation of the laser scanning optical systems according to the sixth through eighth embodiments of the invention, each of which is capable of correcting the displacement of the image plane due to wavelength variations in each of the main-scan plane and the sub-scan plane.

The construction of the laser scanning optical system capable of correcting the displacement of the image plane due to wavelength variations in the sub-scan plane can be most easily implemented by modifying a cylindrical lens arrangement located between a collimator lens assembly and a deflector.

Figure 13A:
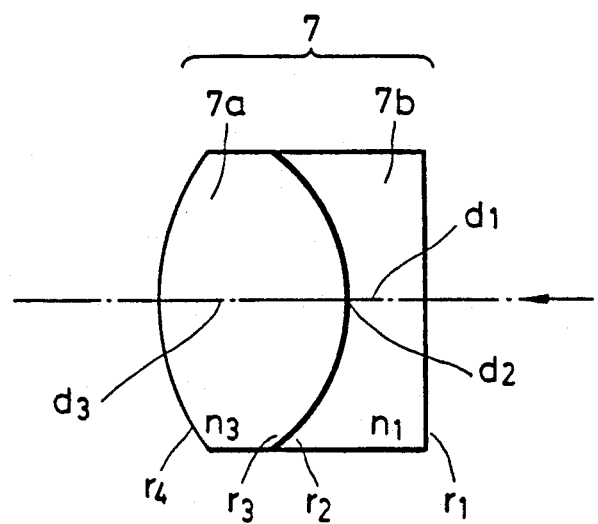
FIG. 13(a) is a schematic view showing a collimator lens assembly for use in a sixth embodiment of the present invention.
Figure 13B:
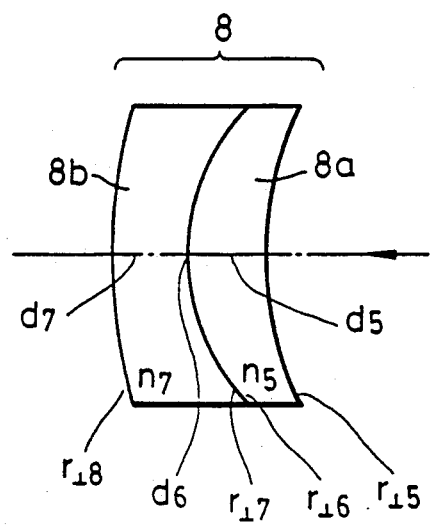
FIG. 13(b) is a schematic view showing a cylindrical lens assembly for use in the sixth embodiment of the present invention.

FIGS. 13(a) and 13(b) schematically show a collimator lens assembly and a cylindrical lens assembly, respectively, for use in the sixth embodiment of the present invention. FIG. 13(a) shows, in cross section, a collimator lens assembly 7 which is used in a laser scanning optical system having basically the same construction as that shown in FIG. 1. FIG. 13(b) is a cross-sectional view taken along the sub-scan plane and shows a cylindrical lens assembly 8 for use with the collimator lens assembly 7. In each of FIGS. 13(a) and 13(b), the right-hand side corresponds to a laser-source side.

The collimator lens assembly 7 consists of a concave lens element 7b and a convex lens element 7a which are aligned in the order shown from the laser-source side. The cylindrical lens assembly 8 consists of a convex lens element 8a and a concave lens element 8b which are aligned in the order shown from the laser-source side.

Figure 2:
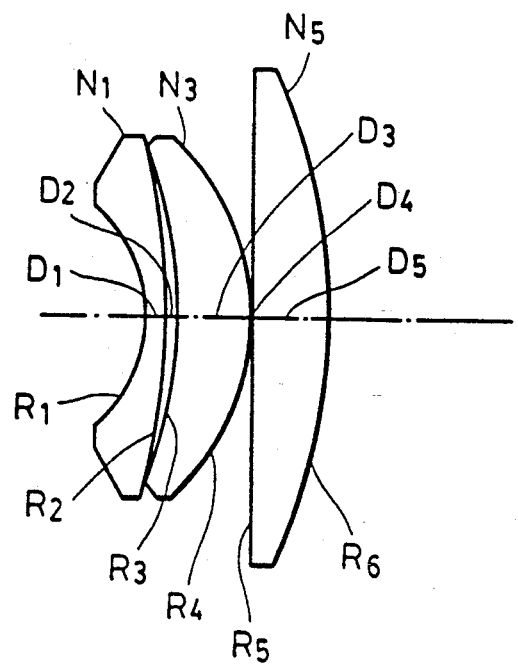
FIG. 2 is a diagrammatic view of the scanning lens arrangement shown in FIG. 1.
Figure 3:
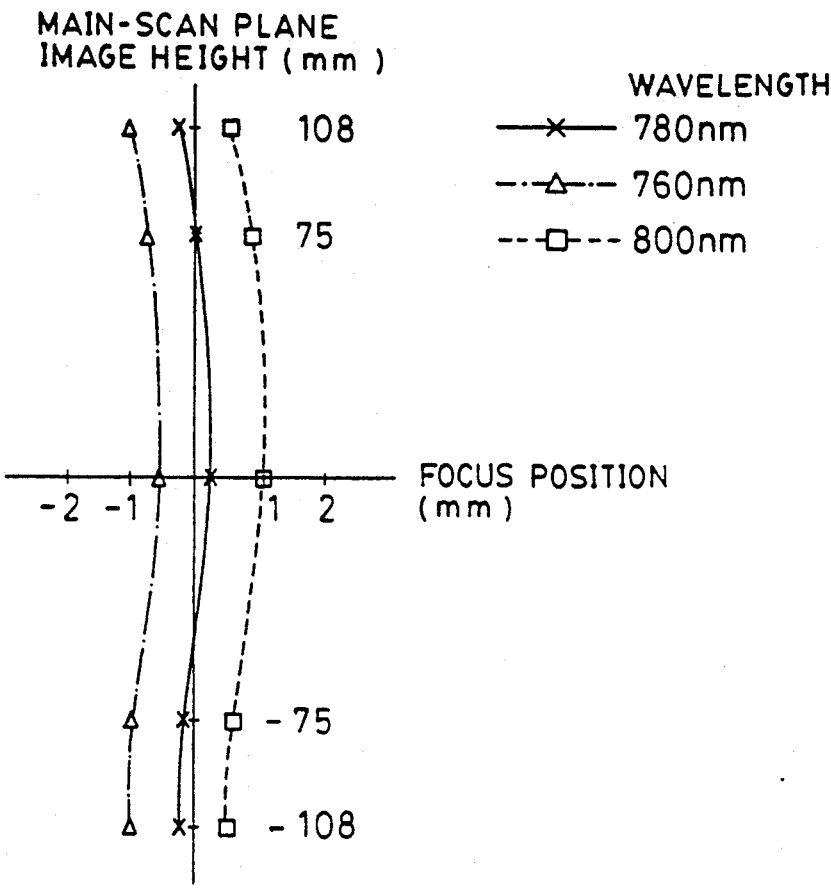
FIG. 3 is a diagram showing the variations in the position of an image plane which are experienced with a conventional type of collimator lens.

Table 8 shows the design values which are used in designing the collimator lens assembly 7 having the construction of FIG. 13(a) in combination with the scanning lens assembly 5 of Table 1 (refer to FIG. 2). Table 9 shows the design values which are used in designing the cylindrical lens assembly 8 having the construction of FIG. 13(b) in combination with the scanning lens assembly 5 of Table 1. In each of Tables 8 and 9, ri represents the radius of curvature of the ith lens surface as viewed from the light-source side, di represents the distance between the ith lens surface and the (i+1)th lens surface, and ni represents the refractive index of a medium located at the rear of the ith lens surface.

TABLE 8

(Sixth Embodiment)

| $r_1 = 132.18062$ | $d_1 = 2.00$ | $n_1 = 1.51072$ |
|---|---|---|
| $r_2 = 4.97103$ | $d_2 = 0.1$ | $n_2 = 1$ |
| $r_3 = 4.97468$ | $d_3 = 5.00$ | $n_3 = 1.76591$ |
| $r_4 = -6.77860$ | | |
| $f = 23.2$ mm | | |
| $f_{NO.} = 4$ | | |
| wavelength = 780 nm | | |

TABLE 9

(Sixth Embodiment)

| $r\perp_5 = -16.9670$ | $r\|_5 = \infty$ | $d_5 = 2.00$ | $n_5 = 1.51072$ |
|---|---|---|---|
| $r\perp_6 = -5.67111$ | $r\|_6 = \infty$ | $d_6 = 0$ | $n_6 = 1$ |
| $r\perp_7 = -5.67111$ | $r\|_7 = \infty$ | $d_7 = 2.00$ | $n_7 = 1.76591$ |
| $r\perp_8 = -9.3076$ | $r\|_8 = \infty$ | | |

TABLE 9-continued (Sixth Embodiment)

wavelength = 780 nm

In Table 7, "r⊥" represents the radius of curvature in the sub-scan plane, while "r ∥" represents the radius of curvature in the main-scan plane.

Figure 14:
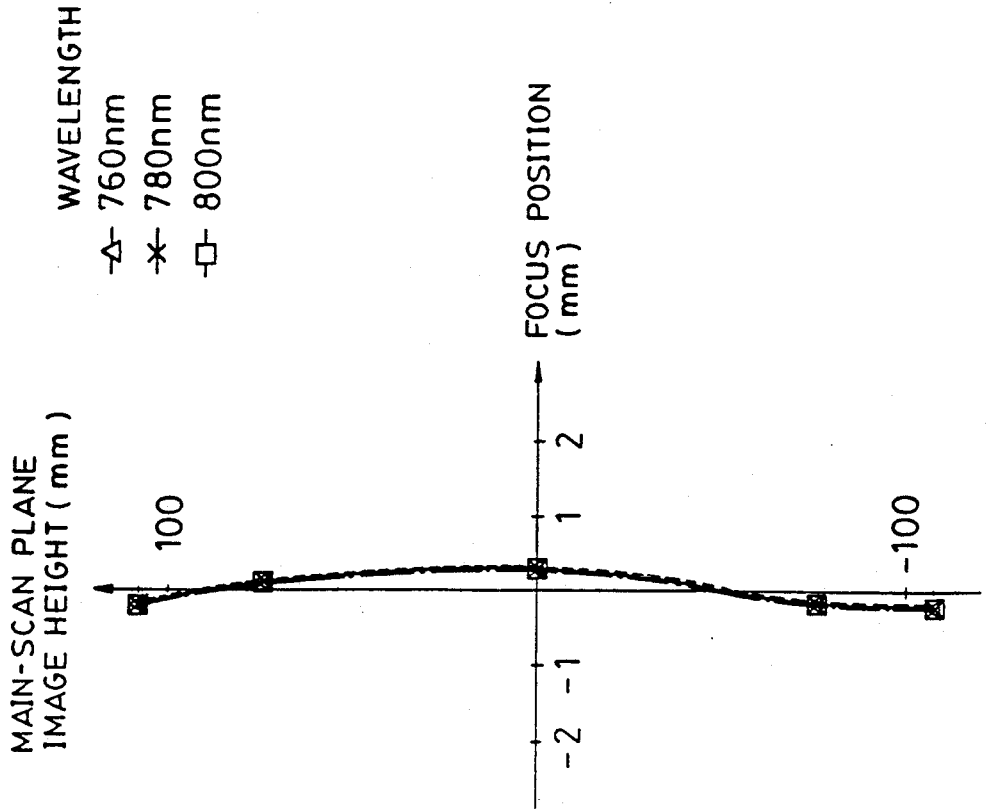
FIG. 14(a) is a diagram showing the variations in an image plane in the main-scan plane which are caused by wavelength variations when the lens assemblies shown in FIGS. 13(a) and 13(b) are used in combination.
FIG. 14(b) is a diagram showing the variations in the image plane in the sub-scan plane which are caused by wavelength variations when the lens assemblies shown in FIGS. 13(a) and 13(b) are used in combination.
Figure 14:
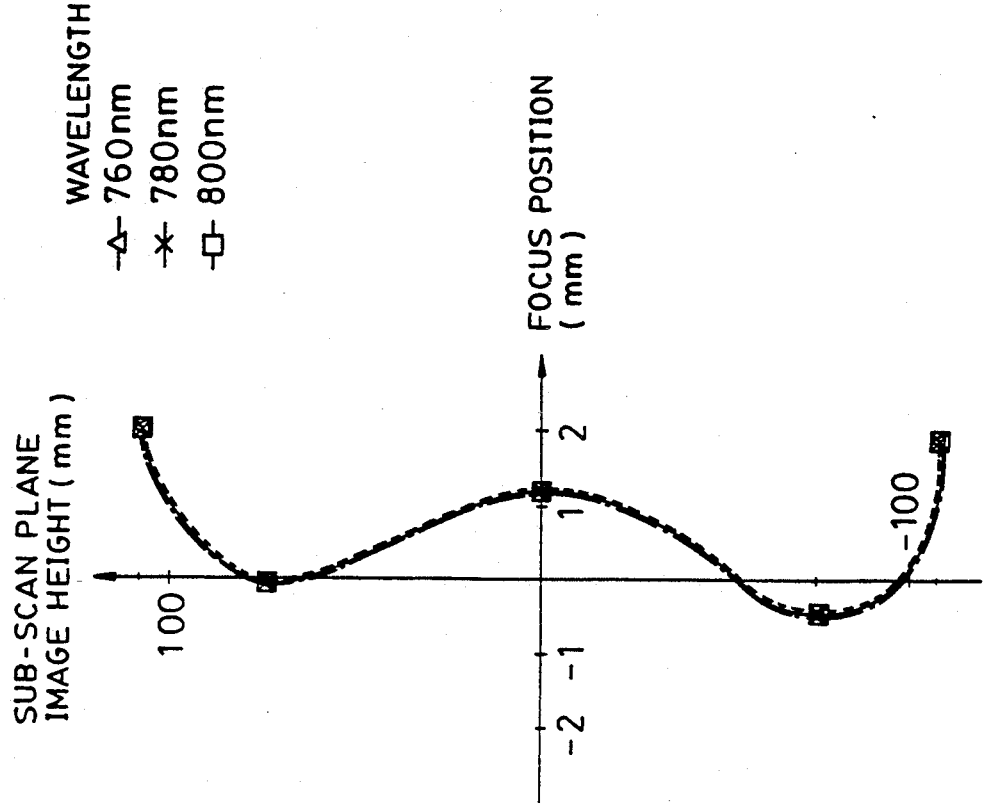

FIGS. 14(a) and 14(b) show variations in the positions of the respective image planes in the main-scan plane and the sub-scan plane due to wavelength variations in a laser beam when the collimator lens assembly 7 of Table 8 and the cylindrical lens assembly 8 of Table 9 are combined with the scanning lens assembly 5 of Table 1 (refer to FIG. 2).

In the sixth embodiment, the collimator lens assembly 7 consists of two lens elements and the cylindrical lens assembly 8 located between the collimator lens assembly 7 and the deflecting polygon mirror 4 also consists of two lens elements. Accordingly, as shown in FIGS. 14(a) and 14(b), the influence of wavelength variations on the variation in the position of the image planes in both the main-scan plane and the sub-scan plane can be minimized.

Figure 15:
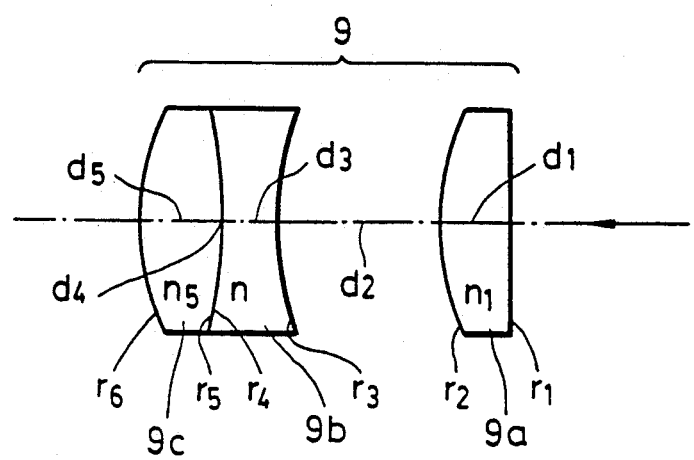
FIG. 15(a) is a schematic view showing a collimator lens assembly for use in a seventh embodiment of the present invention.
FIG. 15(b) is a schematic view showing a cylindrical lens assembly for use in the seventh embodiment of the present invention.
Figure 15:
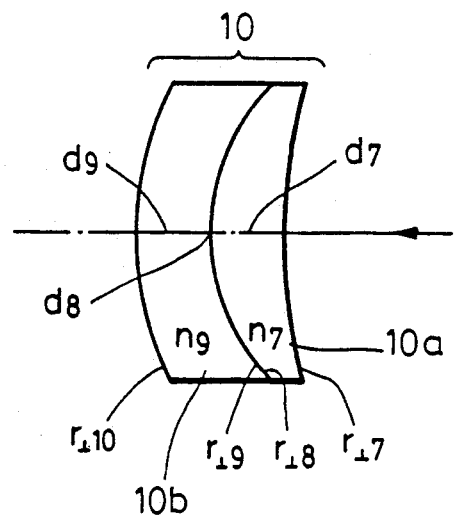

FIGS. 15(a) and 15(b) illustrate the seventh embodiment of the invention. FIG. 15(a) shows the construction of a collimator lens assembly 9, while FIG. 15(b) is a cross-sectional view taken along the sub-scan plane and shows a cylindrical lens assembly 10. In each of FIGS. 15(a) and 15(b), the right-hand side corresponds to a laser-source side.

The collimator lens assembly 9 consists of a convex lens element 9a, a concave lens element 9b and a convex lens element 9c which are aligned in the order shown from the laser-source side. Either of the convex lens elements 9a and 9c is made from an aspherical lens to realize good correction for spherical aberration. The cylindrical lens assembly 10 has a construction similar to the cylindrical lens assembly 7 used in the embodiment shown in FIGS. 13(a) and 13(b), that is, consists of a convex lens element 10a and a concave lens element 10b which are aligned in that order from the laser-source side. In this construction, it is possible to adjust the position of the image plane in the main-scan plane by shifting a cemented doublet consisting of the concave lens element 9b and the convex lens element 9c along the optical axis of the collimator lens assembly 9. In addition, it is possible to adjust the position of an image plane in the sub-scan plane by shifting the cylindrical lens assembly 10 along the optical axis. Accordingly, it is not necessary that the scanning optical system be produced and positioned with excessively severe accuracy.

Table 10 shows the design values which are used in designing the collimator lens assembly 9 having the construction of FIG. 15(a) in combination with the scanning lens assembly 5 of Table 1 (refer to FIG. 2). Table 11 shows the design values which are used in designing the cylindrical lens assembly 10 having the construction of FIG. 15(b) in combination with the scanning lens assembly 5 of Table 1.

Figure 16B:
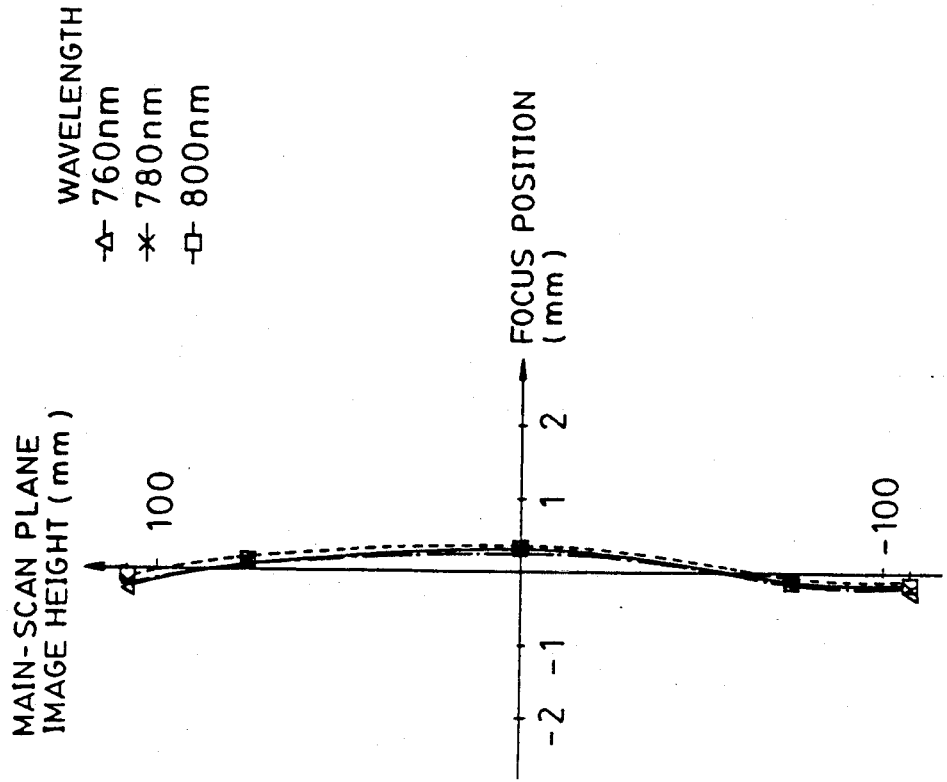
FIG. 16(b) is a diagram showing the variations in an image plane in the sub-scan plane which are caused by wavelength variations when the lens assemblies shown in FIGS. 15(a) and 15(b) are used in combination.
Figure 16A:
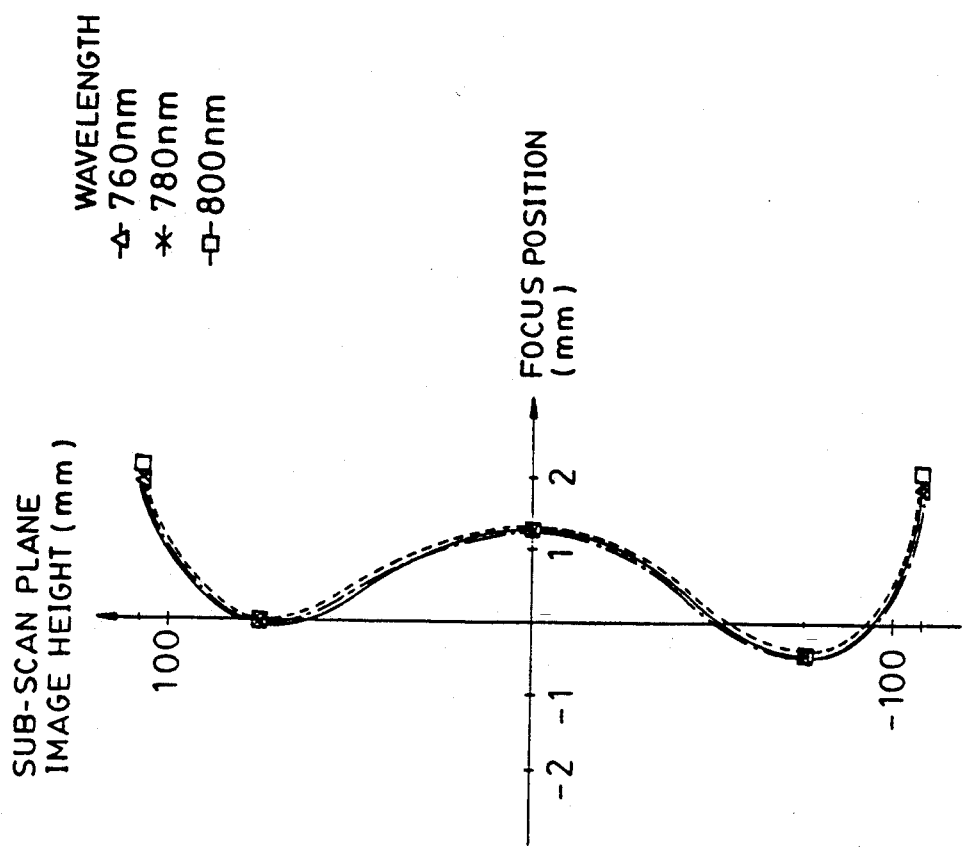
FIG. 16(a) is a diagram showing the variations in the image plane in the main-scan plane which are caused by wavelength variations when the lens assemblies shown in FIGS. 15(a) and 15(b) are used in combination.

FIGS. 16(a) and 16(b) show variations in the positions of the respective image planes in the main-scan plane and the sub-scan plane due to wavelength variations in a laser beam when the collimator lens assembly 9 of Table 10 and the cylindrical lens assembly 10 of Table 11 are combined with the scanning lens assembly 5 of Table 1.

In the seventh embodiment as well, the influence of wavelength variations on the variation in the position of the image planes in both the main-scan plane and the sub-scan plane can be minimized.

TABLE 10

(Seventh Embodiment)

| | | |
|---|---|---|
| r1 = ∞ | d1 = 2.50 | n1 = 1.57645 |
| r2 = aspherical | d2 = 6.00 | n2 = 1 |
| r3 = −12.84291 | d3 = 2.00 | n3 = 1.76591 |
| r4 = 17.52189 | d4 = 0 | n4 = 1 |
| r5 = 17.52189 | d5 = 3.00 | n5 = 1.57645 |
| r6 = −9.37369 | | |
| f = 23.2 mm | | |
| fNO. = 4 | | |
| wavelength = 780 nm | | |

Aspherical data is given by $$X = \frac{h^2/R}{1 + \sqrt{1 - (h/R)^2}} + Ah^2 + Bh^4$$

(h: the distance from the optical axis, and X: the deviation of the spherical surface) where $R = -11.8399$, $A = -7.9792 \times 10^{-3}$ and $B = 4.05317 \times 10^{-5}$

TABLE 11

(Seventh Embodiment)

| | | | |
|---|---|---|---|
| r⊥7 = −16.9670 | r∥7 = ∞ | d7 = 2.00 | n5 = 1.51072 |
| r⊥8 = −5.67111 | r∥8 = ∞ | d8 = 0 | n8 = 1 |
| r⊥9 = −5.67111 | r∥9 = ∞ | d9 = 2.00 | n9 = 1.76591 |
| r⊥10 = −9.30761 | r∥10 = ∞ | | |
| wavelength = 780 nm | | | |

In Table 11, "r⊥" represents radius of curvature in the sub-scan plane, while "r∥" represents radius of curvature in the main-scan plane.

Figure 17A:
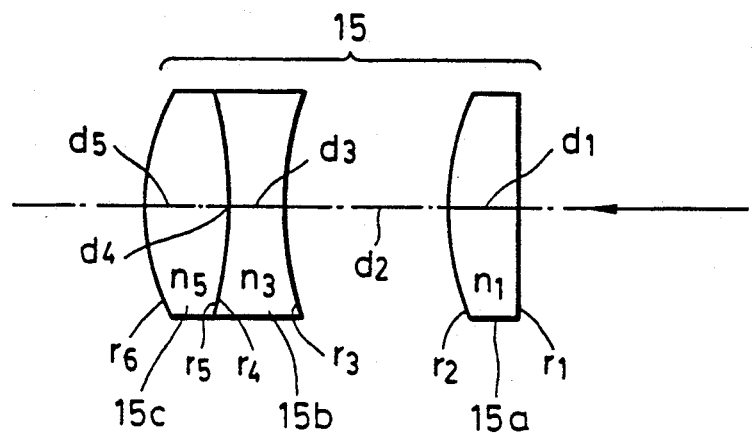
FIG. 17(a) is a schematic view showing a collimator lens assembly for use in an eighth embodiment of the present invention.
Figure 17B:
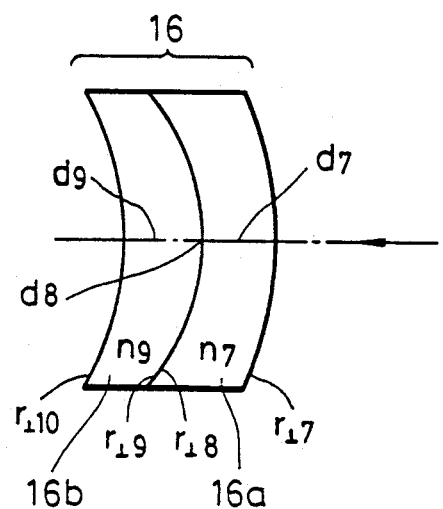
FIG. 17(b) is a schematic view showing a cylindrical lens assembly for use in the eighth embodiment of the present invention.

FIGS. 17(a) and 17(b) illustrate the eighth embodiment of the invention. FIG. 17(a) shows the construction of a collimator lens assembly 15, while FIG. 17(b) is a cross-sectional view taken along the sub-scan plane and shows a cylindrical lens assembly 16.

The collimator lens assembly 15 consists of a convex lens element 15a, a concave lens element 15b and a convex lens element 15c which are aligned in the order shown from the laser-source side. Either of the convex lens elements 15a and 15c is made from an aspherical lens as in the case of the embodiment shown in FIGS. 15(a) and 15(b). The cylindrical lens assembly 16 consists of a convex lens element 16a and a concave lens element 16b which are aligned in the order shown from the laser-source side.

With this construction, it is possible to adjust the position of the image plane in the main-scan plane by shifting a cemented doublet consisting of the concave lens element 15b and the convex lens element 15c along the optical axis of the collimator lens assembly 15. In addition, it is possible to adjust the position of the image plane in the sub-scan plane by shifting the cylindrical lens assembly 16 along the optical axis thereof. Accordingly, the positions of the image planes in the main-scan plane and the sub-scan plane can be independently adjusted.

The aforementioned Table 10 shows the design values which are used in designing the collimator lens assembly 15 having the construction of FIG. 17(a) in combination with the scanning lens assembly 5 of Table 1 (refer to FIG. 2). Table 12 shows the design values which are used in designing the cylindrical lens assembly 16 having the construction of FIG. 17(b) in combination with the scanning lens assembly 5 of Table 1.

In the eighth embodiment as well, the influence of wavelength variations or variations in the position of the image planes in both the main-scan plane and the sub-scan plane can be minimized.

TABLE 12

(Eighth Embodiment)

| | | | |
|---|---|---|---|
| $r\perp_7 = 8.36557$ | $r\|\|_7 = \infty$ | $d_7 = 2.00$ | $n_7 = 1.76591$ |
| $r\perp_8 = 6.09814$ | $r\|\|_8 = \infty$ | $d_8 = 0$ | $n_8 = 1$ |
| $r\perp_9 = 6.09814$ | $r\|\|_9 = \infty$ | $d_9 = 2.00$ | $n_9 = 1.51072$ |
| $r\perp_{10} = 9.92218$ | $r\|\|_{10} = \infty$ | | |
| wavelength = 780 nm | | | |

In Table 12, "$r\perp$" represents the radius of curvature in the sub-scan plane, while "$r\|\|$" represents the radius of curvature in the main-scan plane.

It is to be noted that, with either of the embodiments shown in FIGS. 17(a), 17(b) and FIGS. 15(a), 15(b), it is possible to construct an autofocus arrangement by utilizing the cemented doublet in the collimator lens assembly.

As explained above, any of the sixth to eighth embodiments described above is provided with the optical system which includes a collimator lens assembly and a cylindrical lens assembly and which extends from the laser source to the deflector. This optical system may be corrected to have chromatic aberration opposite to that of the associated scanning lens assembly in both the main-scan plane and the sub-scan plane or it may be overcorrected for chromatic aberration in both the main-scan plane and the sub-scan plane.

In addition, the cylindrical lens assembly may be corrected to have chromatic aberration opposite to that of the scanning lens assembly or it may be overcorrected for chromatic aberration in the sub-scan plane.

As is apparent from the foregoing, variations in the position of the image plane due to wavelength variations in the laser source are corrected taking into account the entire optical system including the collimator lens assembly and the scanning lens assembly as well as the cylindrical lens assembly. Accordingly, it is possible to sufficiently correct the variations in the positions of the respective image planes in the main-scan plane and the sub-scan plane.

In each of the above embodiments, the displacement of the position of the image plane in the main-scan plane or the sub-scan plane due to wavelength variations in the laser source is suppressed by correcting on-axis chromatic aberration taking into account the entire optical system which extends from the laser source to the scan plane. However, such methods still involve a number of problems. For example, although any of these methods can be used to prevent the displacement of the image plane, correction for chromatic aberration of magnification is not carried out. Accordingly, if the wavelength of a semiconductor laser varies due to a mode hop caused by a variation in the ambient temperature, the scanning length of the laser varies and a variation in distortion also occurs at the same time. As a result, as the distance from the optical axis of the scanning lens increases, the deviation of an actually illuminated position from an ideal illumination position increases. Since the mode hop instantaneously occurs, the wavelength of the laser beam in the worst case varies not continually, but dispersively, and scanned images may be recorded in a discontinuous form.

Ninth and tenth embodiments of the invention, which will be described below, are intended to provide an optical arrangement for solving the above problems.

According to each of the ninth and tenth embodiments, there is provided a scanning optical system suitable for use in a laser scanning apparatus in which laser light generated by a laser oscillator is deflected by a light deflector such as a single-surface or a polygon deflection mirror and made to scan an object to be illuminated or an image bearing medium. The scanning optical system is corrected for chromatic aberration of magnification (or one kind of lateral chromatic aberration) which occurs in the main-scan direction (in the beam-scan direction).

Figure 18:
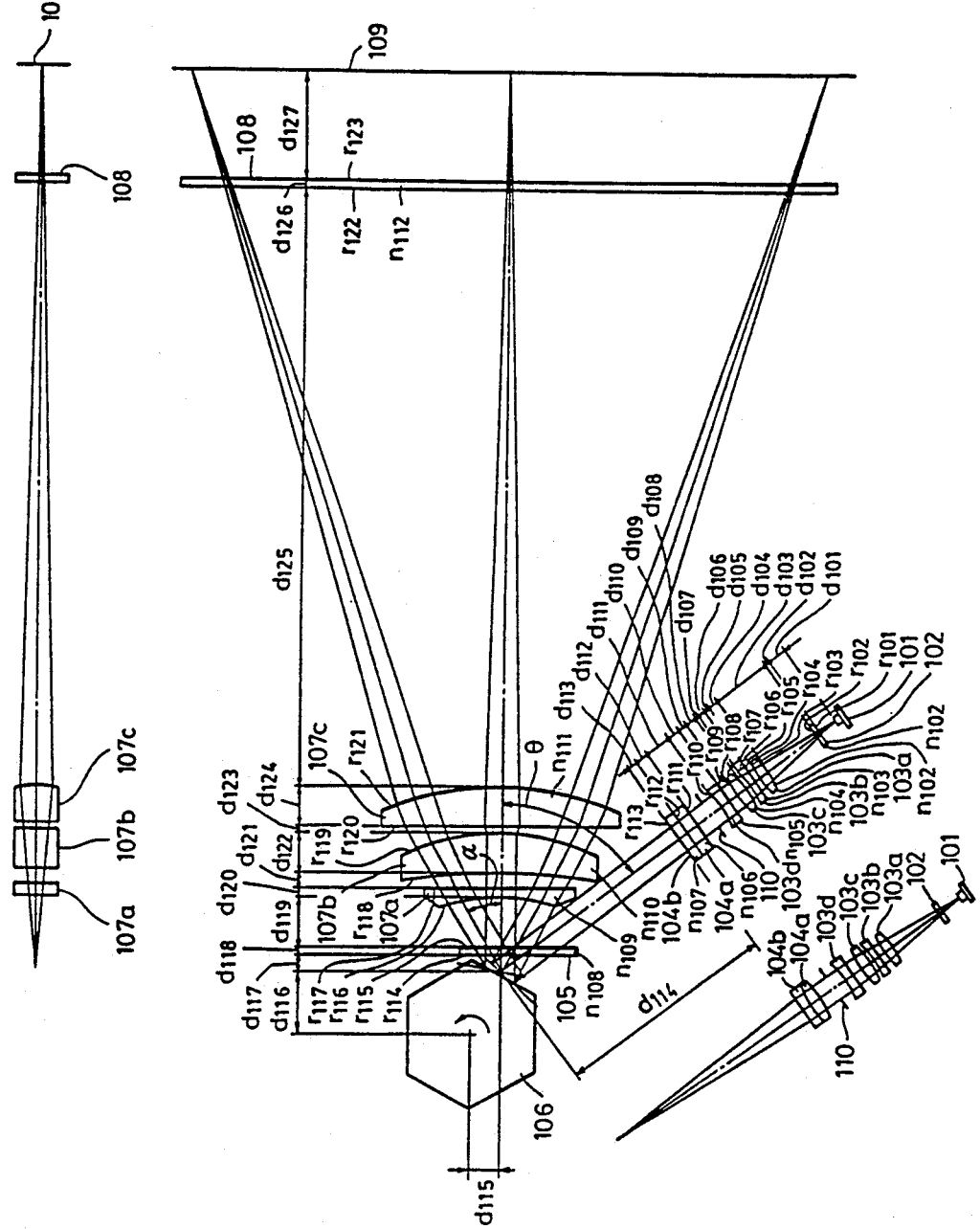
FIG. 18 is a schematic view showing the construction of a laser scanning apparatus according to a ninth embodiment of the present invention.

FIG. 18 is a diagram showing the optical path of a laser scanning apparatus according to the ninth embodiment of the present invention. The middle part of FIG. 18 is a cross-sectional view of the construction of the laser scanning apparatus, taken along the main-scan plane which is formed by a scanning laser beam during a scanning period. The main-scan plane is a plane perpendicular to the plane of the drawing of FIG. 18. In the peripheral part of FIG. 18, there is shown an essential construction of the laser scanning apparatus, taken in the sub-scan direction perpendicular to the main-scan plane, that is, the direction parallel to the axis normal to the beam-scan direction which is one of two axes which crosses the optical axis at right angles.

Referring to FIG. 18, a semiconductor laser diode 101 serves as a light source which is driven to emit laser light modulated in accordance with an image signal. A bundle of light rays emitted from the semiconductor laser diode 101 is converted into a parallel beam of light by a group of collimator lenses 103a, 103b, 103c, and 103d. The parallel beam of light is restricted to a predetermined outer diameter by a stop 110. This light beam is converged in the sub-scan direction only by cylindrical lenses 104a and 104b and the resulting very narrow beam of light is incident upon one of the reflection surfaces of a rotating polygon mirror 106 which serves as a light deflector. The deflected laser light is focused onto an illuminating surface 109 by means of anamorphic lens elements (or scanning lens elements) 107a, 107b, and 107c each of which has fθ characteristics in the beam-scan (or main-scan) direction and which are arranged as a conjugate focusing system. During this time, since the rotating polygon mirror 106 is rotating at an equal speed in the direction indicated by the arrow shown thereon in FIG. 18, the focused beam of light linearly scans the illuminating surface 109.

In the arrangement shown in FIG. 18, glass covers 102, 105 and 108 are provided in position for preventing penetration of dust. The anamorphic lens elements 107a, 107b, and 107c have conjugate points on the reflecting surface of the rotating polygon mirror 107 and the illuminating surface 109. Accordingly, even if the rotating polygon mirror 106 suffers precession during rotation or even if adjacent ones of the reflecting surfaces of the rotating polygon mirror 106 are inclined with respect to each other to some extent due to a variation in the accuracy with which each reflecting surface is produced, the laser beam can scan along the same scanning line on the illuminating surface 109. In this manner, the function of correcting that which is termed inclination can be realized.

Figure 19:
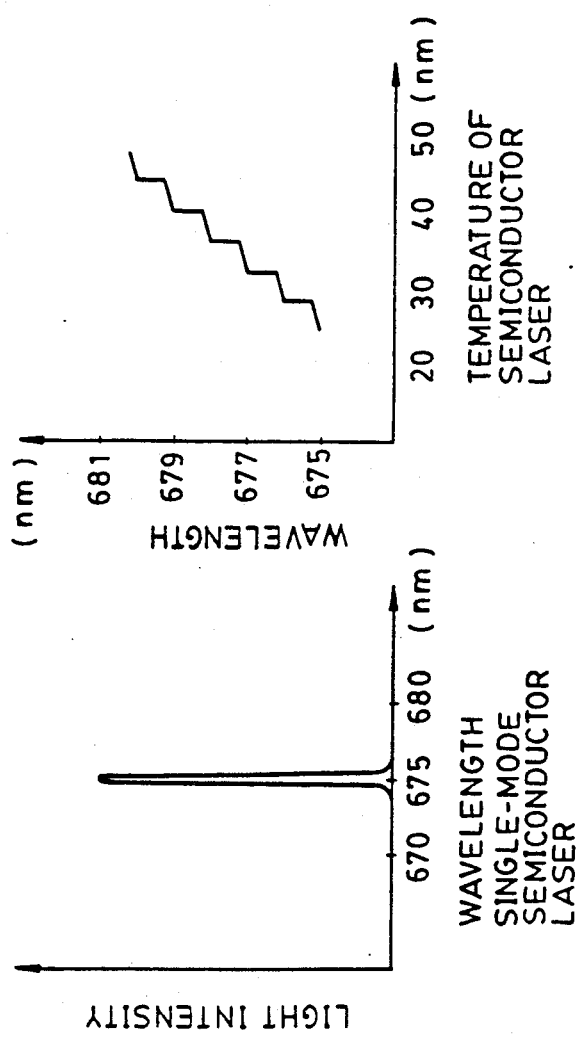
FIG. 19 is a diagram showing the wavelength characteristics of a single-mode semiconductor laser.

If the semiconductor laser diode 101 which serves as the light source consists of a semiconductor laser diode having a wavelength of, for example, 675 nm, a wavelength variation of approximately ±5 nm occurs within a temperature range of 8°-42° C. In addition, as a result of variations in the environmental conditions of the semiconductor laser 101 (including a temperature change in the self-heating thereof), the laser emission mode of the semiconductor laser 101 may vary and the oscillation wavelength thereof may dispersively vary (refer to FIGS. 19 and 20). In such a case, it is necessary to assure the continuity of beam scanning.

Moreover, if a multiple-mode oscillation semiconductor laser of a gain-guide type having a wide wavelength bandwidth (refer to FIG. 21) is employed, a scanning beam spot may not be accurately focused due to chromatic aberration. It is, of course, necessary to cancel the defocused state of the scanning beam spot.

To these ends, in the above embodiment of the present invention, the entire optical system, that is, from the light source to the scanning surface, is corrected for on-axis chromatic aberration. In addition, the chromatic aberration of magnification of the anamorphic lens elements 107a, 107b and 107c is corrected by the beam-deflecting action of the rotating polygon mirror 106 so that positional variation of the scanning beam in the beam-scan plane is kept within $\pm 13$ $\mu$m for a wavelength variation of $\pm 5$ nm.

Figure 22:
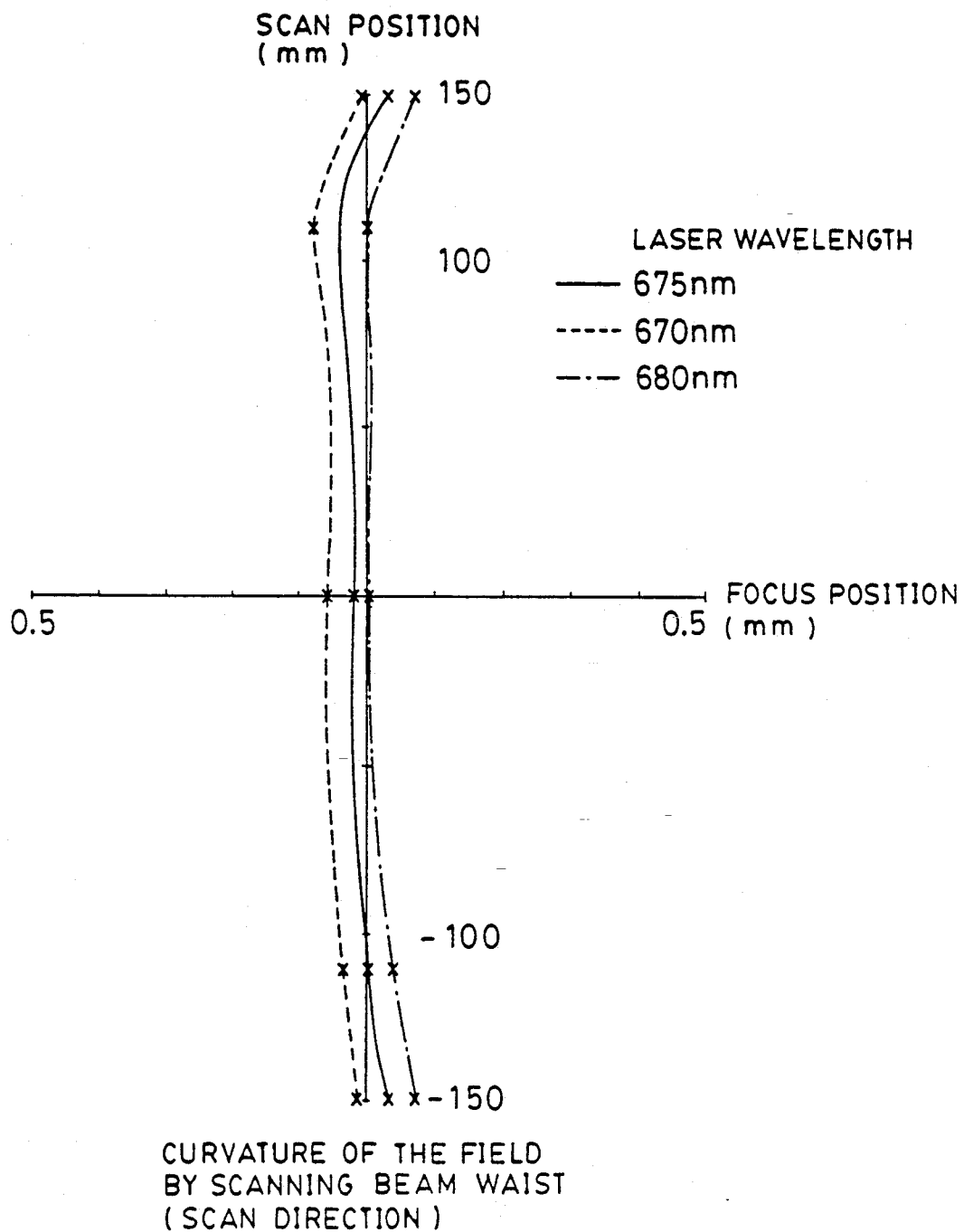
FIG. 22 is an aberration diagram showing the curvature of the field of a beam waist with respect to the beam-scanning (main-scan) direction in the embodiment shown in FIG. 18.
Figure 23:
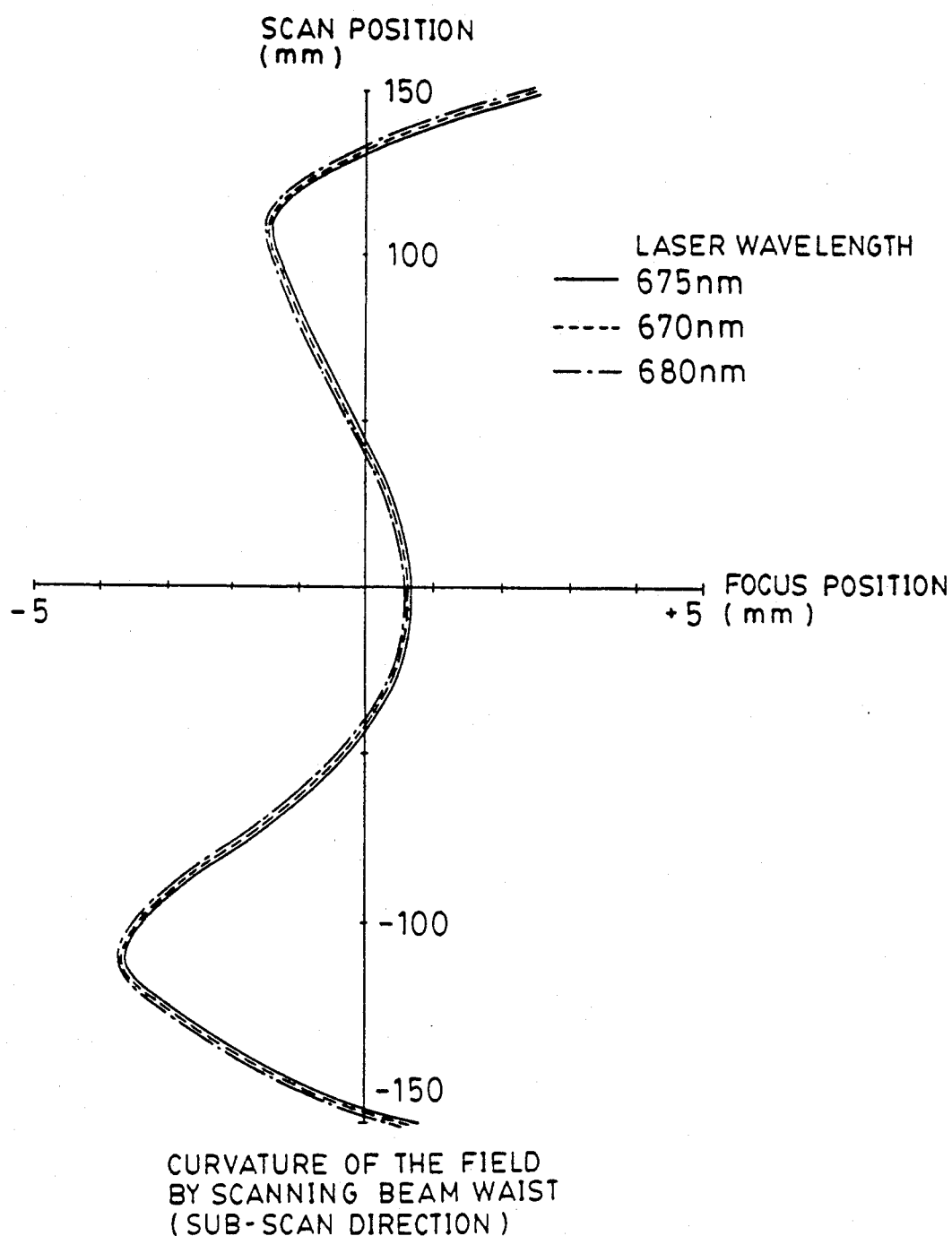
FIG. 23 is an aberration diagram showing the curvature of the field of the beam waist with respect to the sub-scan direction in the embodiment shown in FIG. 18.

More specifically, the on-axis chromatic aberration is corrected to lie within $\pm 50$ $\mu$m for a wavelength variation of $\pm 5$ nm (refer to FIGS. 22 and 23). This amount of variation corresponds to approximately $\pm 2.5$ $\mu$m in terms of lateral chromatic aberration. It follows, therefore, that the spot diameter does not vary within a laser beam waist and that, outside the laser beam waist, if the spot diameter of the scanning beam is assumed to be 30 $\mu$m, the spot diameter merely varies within approximately $30\pm 2.5$ $\mu$m for a wavelength variation of $\pm 5$ nm.

Figure 20:
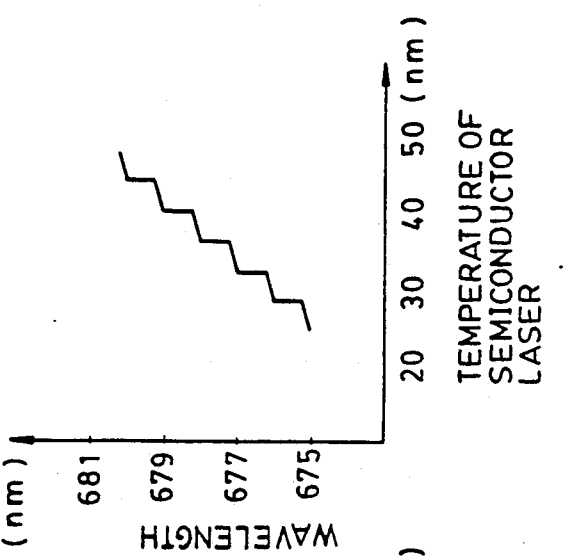
FIG. 20 is a diagram showing the temperature dependency of the oscillating wavelength of a semiconductor laser.
Figure 24:
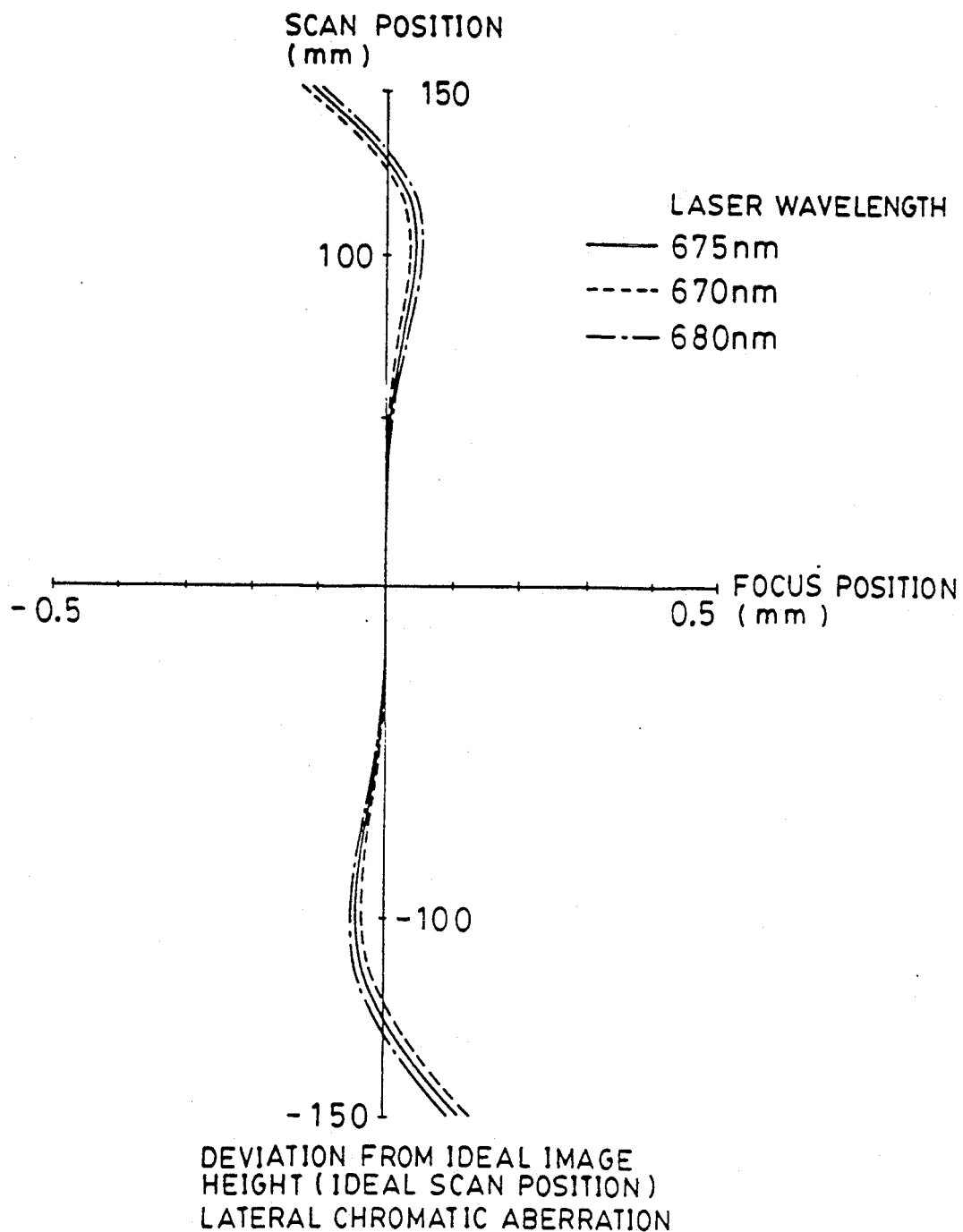
FIG. 24 is a diagram showing the wavelength characteristics of the single-mode semiconductor laser.

In general, a semiconductor laser with a wavelength of, for example, 670 nm or thereabouts suffers a wavelength variation of approximately 1 nm due to a mode hop (refer to FIG. 20). Accordingly, in the above embodiment, chromatic aberration of magnification is corrected so that, if a wavelength variation of 1 nm occurs at an arbitrary time instant during beam scanning, the positional variation of the scanning beam is kept within $\pm 2.5$ $\mu$m ($\approx \pm 13/5$) (refer to FIG. 24).

Since the spot diameter of the scanning beam is approximately 30 $\mu$m in the main-scan direction (approximately 65 $\mu$m in the sub-scan direction) when measured as the width within which a light intensity of $1/e^2$ is held with respect to a peak light intensity, a variation of approximately $\pm 2.5$ $\mu$m corresponds to 1/10 or less of the spot diameter in the main-scan direction when such a positional variation is a dispersive discontinuous variation in the scan position. Since this magnitude of variation is not visible to the human eye, no substantial deterioration in image quality is visually observed and an image of improved quality can therefore be formed by beam scanning.

The above explanation means that, in the case of a wavelength width of 5 nm, it suffices to reduce the dispersive discontinuous variation in the scanning position to about ½ or less of the spot diameter in the main-scan direction.

Figure 21:
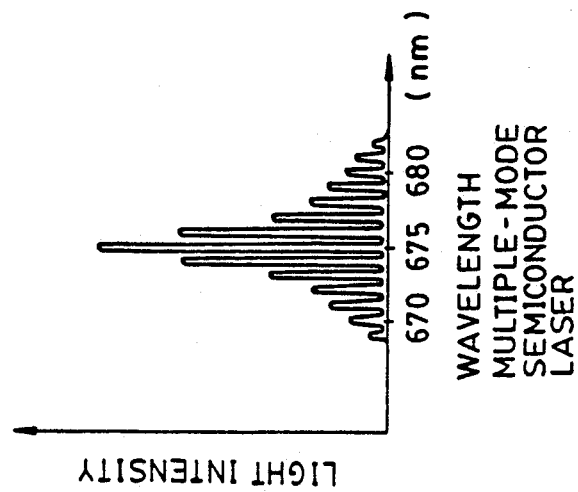
FIG. 21 is a diagram showing the wavelength characteristics of a multiple-mode semiconductor laser.

On the other hand, if a multiple-mode oscillation type of laser is employed, its wavelength bandwidth depends on the number of modes of the laser (refer to FIG. 21). With the above ninth embodiment, it is possible to reduce the difference between the spot diameter on the optical axis and that at a location away from the optical axis in the beam-scan position. Accordingly, it is possible to solve the problem that, in an image formed by beam scanning, although the resolution is high in the part of a beam-scanning area which is on or near the optical axis, it gradually becomes lower toward the periphery. Accordingly, in the present invention, semiconductor laser devices of the multiple-mode type may be employed as a laser oscillator. The optical parameters required in the above ninth embodiment are shown in detail in Table 13. The symbols used in Table 13 correspond to those used in FIG. 18.

Table 13 (Ninth Embodiment, units: mm)

(In the embodiment shown in FIG. 18, it is assumed that the diameter of the stop 110 is 13.2 mm in the main-scan direction and 10.5 mm in the sub-scan direction and that the employed laser wavelength is $675\pm 5$ nm for $\theta = 53°$.)

TABLE 13

(Ninth Embodiment, units mm)

$d_{101} = 2$
$d_{102} = 1$
$d_{103} = 48.512$
$d_{104} = 2.73$
$d_{105} = 4.19$
$d_{106} = 1.52$
$d_{107} = 0.61$
$d_{108} = 3.14$
$d_{109} = 27.71$ (adjustable)
$d_{110} = 4$
$d_{111} = 25$ (adjustable)
$d_{112} = 6$
$d_{113} = 4$
$d_{114} = 107.7$ (adjustable)
$d_{115} = 14.59$
$d_{116} = 29.28$
$d_{117} = 10$
$d_{118} = 2$
$d_{119} = 24.11$
$d_{120} = 4.83$
$d_{121} = 4.72$
$d_{122} = 20.06$
$d_{123} = 2.28$
$d_{124} = 18.13$
$d_{125} = 286.81$
$d_{126} = 2$
$d_{127} = 50$

| MAIN-SCAN DIRECTION (mm) | SUB-SCAN DIRECTION (mm) |
|---|---|
| $r_{101} = \infty$ | $r_{101} = \infty$ |
| $r_{102} = \infty$ | $r_{102} = \infty$ |
| $r_{103} = 166.67$ | $r_{103} = 166.67$ |
| $r_{104} = -44.438$ | $r_{104} = -44.438$ |
| $r_{105} = \infty$ | $r_{105} = \infty$ |
| $r_{106} = 35.753$ | $r_{106} = 35.753$ |
| $r_{107} = 39.996$ | $r_{107} = 39.996$ |
| $r_{108} = -49.716$ | $r_{108} = -49.716$ |
| $r_{109} = \infty$ | $r_{109} = \infty$ |
| $r_{110} = 151.41$ | $r_{110} = 151.41$ |
| $r_{111} = \infty$ | $r_{111} = 38.912$ |
| $r_{112} = \infty$ | $r_{112} = -42.648$ |
| $r_{113} = \infty$ | $r_{113} = \infty$ |
| $r_{114} = \infty$ | $r_{114} = \infty$ |
| $r_{115} = \infty$ | $r_{115} = \infty$ |
| $r_{116} = -80.298$ | $r_{116} = \infty$ |
| $r_{117} = \infty$ | $r_{117} = \infty$ |
| $r_{118} = -1136.15$ | $r_{118} = \infty$ |
| $r_{119} = -102.9$ | $r_{119} = \infty$ |
| $r_{120} = \infty$ | $r_{120} = -90.473$ |
| $r_{121} = -148.41$ | $r_{121} = -28.685$ |
| $r_{122} = \infty$ | $r_{122} = \infty$ |
| $r_{123} = \infty$ | $r_{123} = \infty$ |
| nd | vd |
| $n_{101} = 1.51633$ | $n_{101} = 64.1$ |
| $n_{102} = 1.51633$ | $n_{102} = 64.1$ |
| $n_{103} = 1.72825$ | $n_{103} = 28.5$ |
| $n_{104} = 1.60311$ | $n_{104} = 60.7$ |
| $n_{105} = 1.51633$ | $n_{105} = 64.1$ |
| $n_{106} = 1.51633$ | $n_{106} = 64.1$ |

TABLE 13-continued (Ninth Embodiment, units mm)

| | |
|---|---|
| $n_{107} = 1.72825$ | $\nu_{107} = 28.5$ |
| $n_{108} = 1.51633$ | $\nu_{108} = 64.1$ |
| $n_{109} = 1.62004$ | $\nu_{109} = 36.3$ |
| $n_{110} = 1.60311$ | $\nu_{110} = 60.7$ |
| $n_{111} = 1.62299$ | $\nu_{111} = 58.2$ |
| $n_{112} = 1.51633$ | $\nu_{112} = 64.1$ |

OTHER PARAMETERS a) beam-scanning length: ±150 mm about the optical axis, b) circumscribed circle diameter of the rotating polygon mirror 106: 73 mm (hexahedron), c) spot diameter of a light beam focused onto a predetermined position by means of the scanning lens elements (or anamorphic lens elements) 107a to 107c: 30 μm (with respect to the main-scan direction), e) total focal length f of the scanning lens elements 107a to 107c in the main-scan direction: 286.5 mm, and f) scanning angle α made by the deflector: 30° (scanning angle α = maximum deflection angle of the scanning lens assembly of FIG. 18 with respect to the optical axis).

The following is a description of formulas for correcting chromatic aberration of magnification in the main-scan direction (or beam-scan direction) in a laser scanning apparatus arranged to deflect a beam of laser light emitted from a laser source by means of a deflector and focus the deflected laser beam onto a predetermined position by means of a scanning lens arrangement having f·θ characteristics.

Abbe number with respect to D lines $\nu d$ is given by $$\nu d = \frac{nd - 1}{n_F - n_C}$$

$$\frac{1}{\nu d} = \frac{(n_F - 1) - (n_C - 1)}{nd - 1}$$

$$\frac{\phi d}{\nu d} = \frac{(n_F - 1) - (n_C - 1)}{nd - 1} (nd - 1) \left( \frac{1}{r_1} - \frac{1}{r_2} \right)$$

where $\phi d$ is the power with respect to D lines of each lens element.

$$\frac{\phi d}{\nu d} = \frac{nd - 1}{nd - 1} \left\{ (n_F - 1) \left( \frac{1}{r_1} - \frac{1}{r_2} \right) - (n_C - 1) \left( \frac{1}{r_1} - \frac{1}{r_2} \right) \right\} \approx \phi_F - \phi_C$$

where $\phi F - \phi C$ represents the power difference between the F line and the C line.

$$\phi_A \approx \sum_i \phi i$$

where $\phi A$ represents the power of the entire scanning lens arrangement and $\phi i$ represents the power of each lens element which constitutes the scanning lens arrangement. Therefore, power variation in the scanning lens arrangement due to a wavelength variation is $$a \frac{\delta \lambda}{\lambda_C - \lambda_F} \sum_i \frac{\phi i}{\nu d i}$$

where a represents a correction constant (0.2), δλ represents the width of wavelength variation due to the temperature change of the laser source (nm), λc represents the wavelength of the C line (656.27 nm), λF represents the wavelength of the F line (486.13 nm), and δdi and νdi respectively represent the reciprocal of the focal length with respect to D lines and the Abbe number with respect to D lines of each lens element which constitutes the scanning lens arrangement. If the scanning lens arrangement consists of two lens elements, i=1, 2; if the scanning lens arrangement consists of three lens elements, i=1, 2, 3.

Therefore, variation in the focal length of the scanning lens arrangement due to wavelength variation is $$\left\{ \frac{1}{\frac{1}{f} + \left| a \frac{\delta \lambda}{\lambda_C - \lambda_F} \sum_i \frac{\phi d i}{\nu d i} \right|} - f \right\}$$

where f represents the focal length of the scanning lens arrangement in the main-scan direction.

Accordingly, the amount of displacement (chromatic aberration of magnification) of a beam-scan position corresponding to the maximum deviation from the optical axis of the scanning lens arrangement is $$\left\{ \frac{1}{\frac{1}{f} + \left| a \frac{\delta \lambda}{\lambda_C - \lambda_F} \sum_i \frac{\phi d i}{\nu d i} \right|} - f \right\} \cdot \alpha$$

where α represents the scanning angle [radian] made by the deflector, corresponding to the angle of the maximum deflection from the optical axis of the scanning lens arrangement.

Accordingly, as for a laser scanning apparatus arranged to deflect a beam of laser light emitted from a laser source by means of a deflector and focus the deflected laser beam onto a predetermined position by means of a scanning lens arrangement having f·θ characteristics, it is preferable that chromatic aberration of magnification be corrected to be ½ or less of the spot diameter of the scanning light beam irrespective of a wavelength variation.

Therefore, $$\left| \frac{1}{\frac{1}{f} + a \frac{\delta \lambda}{\lambda_C - \lambda_F} \sum_i \frac{\phi d i}{\nu d i}} - f \right| \cdot \alpha \leq d/2 \quad (1)$$

where d represents the spot diameter in the main-scan direction, more specifically, the required spot diameter in the main-scan direction of a beam spot focused on the predetermined position by means of the scanning lens arrangement.

The above formula (1) is based on the assumption that a beam of light which is parallel to the main-scan direction, that is, the main-scan plane, is incident upon the scanning lens arrangement.

Moreover, the formula (1) is based on the assumption that a scanning lens arrangement having f·$\theta$ characteristics is employed. If a scanning lens arrangement having ftanQ characteristics is employed, $\alpha$ in the above formula (1) is substituted for tan$\alpha$.

Figure 25:
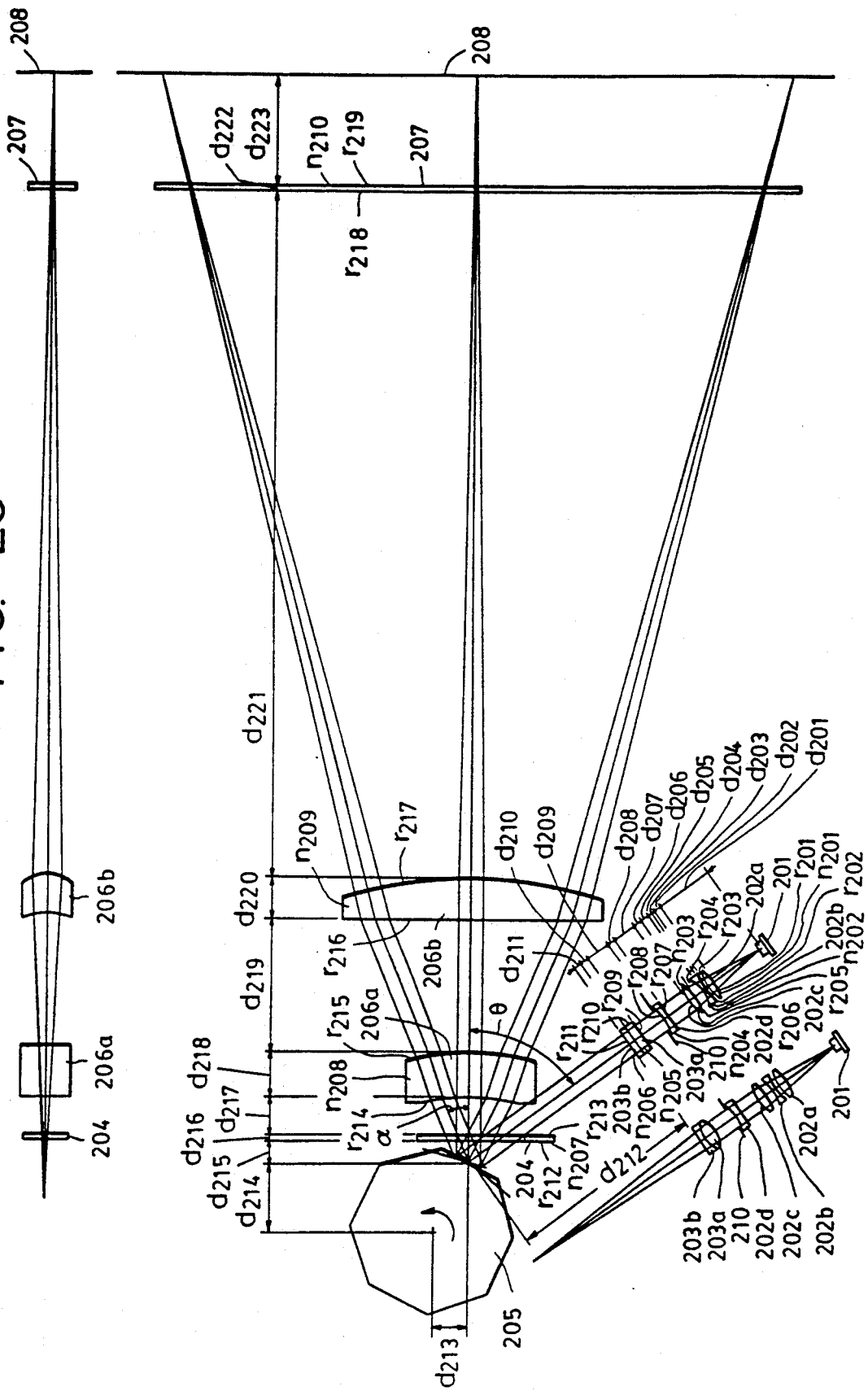
FIG. 25 is a schematic view showing the construction of a laser scanning apparatus according to a tenth embodiment of the present invention.

FIG. 25 is a diagram showing the optical path of a laser scanning apparatus according to a tenth embodiment of the present invention. The middle part of FIG. 25 illustrates the construction of the laser scanning apparatus, taken along the main-scan plane which is formed by a scanning beam during a scanning period. The main-scan plane is a plane perpendicular to the surface of the sheet of FIG. 25. In the peripheral part of FIG. 25, there is shown the essential construction of the laser scanning apparatus, taken in the sub-scan direction perpendicular to the main-scan plane, that is, the direction perpendicular to the beam-scan (or main-scan) direction of the two scan directions each of which crosses the optical axis at right angles).

As shown in FIG. 25, a semiconductor laser diode 201 serves as a light source which is driven to emit laser light modulated in accordance with an image signal. A bundle of light rays emitted from the semiconductor laser diode 201 is converted into a parallel beam of light by a group of collimator lenses 202a, 202b, 202c and 202d. The parallel beam of light is restricted to a predetermined outer diameter by a stop 210. This light beam is converged in the sub-scan direction only by cylindrical lenses 203a and 203b, and the resultant very narrow beam of light is incident upon one of the reflection surfaces of a rotating polygon mirror 205 which serves as a light deflector. The deflected laser light is focused onto an illuminating surface 208 by means of anamorphic lens elements (or scanning lens elements) 206a and 206b each of which has f·$\theta$ characteristics in the beam-scan (or main-scan) direction and which are arranged as a conjugate focusing system. During this time, since the rotating polygon mirror 205 is rotating at an equal speed in the direction indicated by the arrow shown thereon in FIG. 25, the focused beam of light linearly scans the illuminating surface 208.

In the arrangement shown in FIG. 25, glass covers 204 and 207 are provided in a position for preventing penetration of dust. The anamorphic lens elements 206a and 206b have conjugate points on the reflecting surface of the rotating polygon mirror 205 and the illuminating surface 208. Accordingly, even if the rotating polygon mirror 208 suffers precession during rotation or even if adjacent ones of the reflecting surfaces of the rotating polygon mirror 208 are inclined with respect to each other to some extent due to a variation in the accuracy with which each reflecting surface is produced, the laser beam can scan along the same scanning line on the illuminating surface 208. In this manner, the function of correcting what is called inclination can be realized. The optical parameters required in the above embodiment are shown in detail in Table 14. The symbols used in Table 14 correspond to those used in FIG. 25.

Table 14 (Tenth Embodiment, units: mm)

(In the embodiment shown in FIG. 25, it is assumed that the diameter of the stop 210 is 11.0 mm in the main-scan direction and 7.2 mm in the sub-scan direction and that the employed laser wavelength is 675 ±5 nm for $\theta = 53°$.)

TABLE 14

(Tenth Embodiment, units: mm)

$d_{201} = 29.168$
$d_{202} = 2.58$
$d_{203} = 1.32$
$d_{204} = 1.04$
$d_{205} = 4.12$
$d_{206} = 4.11$
$d_{207} = 12.00$ (adjustable)
$d_{208} = 3.00$
$d_{209} = 12.00$ (adjustable)
$d_{210} = 4.00$
$d_{211} = 3.00$
$d_{212} = 74.18$ (adjustable)
$d_{213} = 17.21$
$d_{214} = 34.72$
$d_{215} = 10.00$
$d_{216} = 2.00$
$d_{217} = 18.22$
$d_{218} = 21.02$
$d_{219} = 61.68$
$d_{220} = 18.36$
$d_{221} = 320.0$
$d_{222} = 2.00$
$d_{223} = 50.0$

| MAIN-SCAN DIRECTION (mm) | SUB-SCAN DIRECTION (mm) |
|---|---|
| $r_{201} = 83.906$ | $r_{201} = 83.906$ |
| $r_{202} = -21.826$ | $r_{202} = -21.826$ |
| $r_{203} = -41.862$ | $r_{203} = -41.862$ |
| $r_{204} = 15.253$ | $r_{204} = 15.253$ |
| $r_{205} = 30.467$ | $r_{205} = 30.467$ |
| $r_{206} = -16.997$ | $r_{206} = -16.997$ |
| $r_{207} = \infty$ | $r_{207} = \infty$ |
| $r_{208} = 101.8$ | $r_{208} = 101.8$ |
| $r_{209} = \infty$ | $r_{209} = 30.034$ |
| $r_{210} = \infty$ | $r_{210} = -30.034$ |
| $r_{211} = \infty$ | $r_{211} = \infty$ |
| $r_{212} = \infty$ | $r_{212} = \infty$ |
| $r_{213} = \infty$ | $r_{213} = \infty$ |
| $r_{214} = -101.41$ | $r_{214} = \infty$ |
| $r_{215} = -110.47$ | $r_{215} = \infty$ |
| $r_{216} = -147.43$ | $r_{216} = \infty$ |
| $r_{217} = -41.694$ | $r_{217} = -218.74$ |
| $r_{218} = \infty$ | $r_{218} = \infty$ |
| $r_{219} = \infty$ | $r_{219} = \infty$ |
| nd | $\nu$d |
| $n_{201} = 1.51633$ | $n_{201} = 64.1$ |
| $n_{202} = 1.72825$ | $n_{202} = 28.5$ |
| $n_{203} = 1.60311$ | $n_{203} = 60.7$ |
| $n_{204} = 1.51633$ | $n_{204} = 64.1$ |
| $n_{205} = 1.51633$ | $n_{205} = 64.1$ |
| $n_{206} = 1.74077$ | $n_{206} = 27.8$ |
| $n_{207} = 1.51633$ | $n_{207} = 64.1$ |
| $n_{208} = 1.62299$ | $n_{208} = 58.2$ |
| $n_{209} = 1.60311$ | $n_{209} = 60.7$ |
| $n_{210} = 1.51633$ | $n_{210} = 64.1$ |

OTHER PARAMETERS a) beam-scanning length: ±150 mm about the optical axis, b) circumscribed circle diameter of the rotating polygon mirror 205: 82 mm (octahedron), c) spot diameter of a light beam focused onto a predetermined position by means of the scanning lens elements (or anamorphic lens elements) 206a and 206b: 45 $\mu$m (with respect to the main-scan direction), e) total focal length f of the scanning lens elements 206a and 206b in the main-scan direction: 343.5 mm, and f) scanning angle $\alpha$ made by the deflector: 24.75° (scanning angle $\alpha$=maximum deflection angle of the scanning lens arrangement of FIG. 25 with respect to the optical axis).

By utilizing a scanning lens arrangement which can satisfy the above formula (1), it is possible to correct the chromatic aberration of magnification in the main-scan direction (beam-scan direction). Accordingly, it is possible to prevent a scan image from being recorded in discontinuous form due to the variations in the scanning position caused by wavelength variations in the semiconductor laser. Even if a multiple-mode oscillation type of semiconductor laser is employed, it is possible to prevent off-axis resolution from deteriorating due to the wide wavelength bandwidth of such a semiconductor laser. In addition, since the temperature controlling device which has otherwise been required for the semiconductor laser may be omitted, it is possible to reduce the manufacturing cost.

While the present invention has been described with respect to what is presently considered to be preferred embodiments, it is to be understood that the invention is not limited to the disclosed embodiments. To the contrary, the present invention includes all modifications and arrangements within the scope of the appended claims.

What is claimed is:

1. An achromatic scanning optical apparatus for scanning a predetermined plane, said scanning optical apparatus comprising:
   a laser source for generating a laser light beam having a predetermined wavelength;
   deflecting means for deflecting the light beam from said laser source;
   an optical arrangement for scanning the predetermined plane, said optical arrangement comprising a first optical system for directing the light beam generated by said laser source to said deflecting means and a second optical system for focusing the light beam deflected by said deflecting means onto the predetermined plane at a focus position for scanning the predetermined plane; and
   correcting means for correcting any change in the focus position of the light beam on the predetermined plane caused by wavelength variations of the laser beam from said laser source through the entire optical arrangement.

2. An achromatic scanning optical apparatus according to claim 1, wherein said first optical system has chromatic aberration characteristically opposite to chromatic aberration of said second optical system.

3. An achromatic scanning optical apparatus according to claim 1, further comprising means for overcorrecting chromatic aberration of said first optical system.

4. An achromatic scanning optical apparatus according to claim 1, wherein said first optical system comprises a collimator lens arrangement.

5. An achromatic scanning optical apparatus according to claim 1, wherein said first optical system comprises a cylindrical lens arrangement.

6. An achromatic scanning optical apparatus according to claim 1, wherein said second optical system has f·θ characteristics.

7. An achromatic scanning optical apparatus for scanning a predetermined position, said scanning optical apparatus comprising:
   a laser source for generating a laser beam;
   a collimator lens assembly comprising a plurality of lens elements for collimating the light beam generated by said laser source;
   a cylindrical lens assembly comprising a plurality of lens elements for converging the light beam collimated by said collimator lens assembly;
   deflecting means for deflecting the light beam converged by said cylindrical lens assembly; and
   an optical system for focusing the light beam deflected by said deflecting means onto the predetermined position for scanning of the predetermined position,
   wherein said optical system has chromatic aberration characteristically opposite to a total chromatic aberration of said collimator lens assembly and said cylindrical lens assembly.

8. An achromatic scanning optical apparatus according to claim 7, wherein said first optical system comprises a cemented lens arrangement for travelling along an optical axis of said first optical system.

9. An achromatic scanning optical apparatus according to claim 7, wherein said collimator lens assembly comprises a cemented lens arrangement for travelling along an optical axis of said collimator lens assembly.

10. An achromatic scanning optical apparatus according to claim 7, wherein said collimator lens assembly has chromatic aberration characteristically opposite to chromatic aberration of said optical system.

11. An achromatic scanning optical apparatus comprising:
   a light source for generating a light beam;
   deflecting means for deflecting the light beam generated by said light source; and
   a scanning lens arrangement having an f·θ characteristic for focusing the light beam deflected by said deflecting means on a predetermined position to scan the predetermined position, said scanning lens arrangement receiving an incident beam of parallel light in a main-scan plane; wherein $$\left| \frac{1}{\frac{1}{f} + 0.2 \frac{\delta\lambda}{\lambda c - \lambda_F} \sum_i \frac{\phi di}{\nu di}} - f \right| \cdot \alpha \leq d/2$$

where
f: focal length of said scanning lens arrangement in said main-scan plane,
δλ: width of a wavelength variation,
λc: wavelength of a C line,
λF: wavelength of an F line,
φdi: reciprocal of the focal length with respect to D lines of each lens element which constitutes said scanning lens arrangement,
νdi: Abbe number with respect to D lines of each lens element which constitutes said scanning lens arrangement,
α: scanning angle, and
d: spot diameter measured in the main-scan direction.

12. An achromatic scanning optical apparatus scanning a predetermined plane, said scanning optical apparatus comprising:
   a laser source for generating a laser light beam having a predetermined wavelength;
   deflecting means for deflecting the light beam from said laser source;
   an optical arrangement for scanning the predetermined plane, said optical arrangement comprising a first optical system for directing the light beam generated by said laser source to said deflecting means and a second optical system for focusing the light beam deflected by said deflecting means onto the predetermined plane at a focus position for scanning the predetermined plane, wherein said first optical system has chromatic aberration characteristically opposite to chromatic aberration of said second optical system.

13. An achromatic scanning optical apparatus according to claim 12, wherein said first optical system comprises a cemented lens arrangement for travelling along an optical axis of said first optical system.

14. A laser recording apparatus comprising:
a laser source for generating a laser light beam having a predetermined wavelength;
a recording medium;
deflecting means for deflecting the light beam from said laser source;
an optical arrangement for scanning said recording medium, said optical arrangement comprising a first optical system for directing the light beam generated by said laser source to said deflecting means and a second optical system for focusing the light beam deflected by said deflecting means onto said recording medium at a focus position for scanning said recording medium; and
correcting means for correcting any change in the focus position of the light beam on said recording medium, caused by wavelength variations of the laser beam from said laser source through the entire optical arrangement.

15. A laser recording apparatus according to claim 14, wherein said first optical system has chromatic aberration characteristically opposite to chromatic aberration of said second optical system.

16. A laser recording apparatus according to claim 14, further comprising means for overcorrecting chromatic aberration of said first optical system.

17. A laser recording apparatus according to claim 14, wherein said first optical system comprises a collimator lens arrangement.

18. A laser recording apparatus according to claim 14, wherein said first optical system comprises a cylindrical lens arrangement.

19. A laser recording apparatus according to claim 14, wherein said second optical system has f·θ characteristics.

20. A laser recording apparatus according to claim 14, wherein said first optical system comprises a cemented lens arrangement for travelling along an optical axis of said first optical system.

21. A laser recording apparatus comprising:
a laser source for generating a laser light beam;
a recording medium;
a collimator lens assembly comprising a plurality of lens element for collimating the light beam generated by said laser source;
a cylindrical lens assembly comprising a plurality of lens elements for converging the light beam collimated by said collimator lens assembly;
deflecting means for deflecting the light beam converted by said cylindrical lens assembly; and
an optical system for focusing the light beam deflected by said deflecting means onto said recording medium for scanning said recording medium, wherein said optical system has chromatic aberration characteristically opposite to a total chromatic aberration of said collimator lens assembly and said cylindrical lens assembly.

22. A laser recording apparatus according to claim 21, wherein said collimator lens assembly comprises a cemented lens arrangement for travelling along an optical axis of said collimator lens assembly.

23. A laser recording apparatus according to claim 21, wherein said collimator lens assembly has chromatic aberration characteristically opposite to chromatic aberration of said optical system.

24. A laser recording apparatus comprising:
a light source for generating a light beam;
a recording medium;
deflecting means for deflecting the light beam generated by said light source; and
a scanning lens arrangement having f·θ characteristic for focusing the light beam deflected by said deflecting means onto said recording medium to scan said recording medium, said scanning lens arrangement receiving an incident beam of parallel light in a main-scan plane, wherein $$\left| \frac{1}{\frac{1}{f} + 0.2 \frac{\delta\lambda}{\lambda_c - \lambda_F} \sum_i \frac{\phi di}{\upsilon di}} - f \right| \cdot \alpha \leq d/2$$

where
f: local length of said scanning lens arrangement in said main-scan plane,
δλ: width of a wavelength variation,
δc: wavelength of a C line;
δf: wavelength of an F line;
φdi: reciprocal of the focal length with respect to D lines of each lens element which constitutes said scanning lens arrangement,
υdi: Abbe number with respect to D lines of each lens element which constitutes said scanning lens arrangement,
α: scanning angle,
d: spot diameter measured in the main-scan direction.

25. A laser recording apparatus comprising:
a laser source for generating a laser light beam having a predetermined wavelength;
a recording medium;
deflecting means for deflecting the light beam from said laser source;
an optical arrangement for scanning said recording medium, said optical arrangement comprising a first optical system for directing the light beam generated by said laser source to said deflecting means and a second optical system for focusing the light beam deflected by said deflecting means onto said recording medium at a focus position for scanning said recording medium,
wherein said first optical system has chromatic aberration characteristically opposite to chromatic aberration of said second optical system.

26. A laser recording apparatus according to claim 25, wherein said first optical system comprises a cemented lens arrangement for travelling along an optical axis of said first optical system.

* * * * *

UNITED STATES PATENT AND TRADEMARK OFFICE
CERTIFICATE OF CORRECTION

PATENT NO. : 5,270,851

DATED : December 14, 1993

INVENTOR(S) : JUN MAKINO, ET AL.

It is certified that error appears in the above-indentified patent and that said Letters Patent is hereby corrected as shown below:

COLUMN 6:

Line 40, "$\pm 20\ 82$ m" should read --$\pm 20\ \mu$m--.

COLUMN 8:

Line 62, "$R = {}^{11.8399,\ A\ =\ 7.97920\ x\ 10\text{-}3}$ and B" should read
--$R = 11.8399$, $A = 7.9792 \times 10^{-3}$ and B--.

COLUMN 9:

Line 14, "are" should read --is--.

COLUMN 12:

Line 21, "$R = {}^{-11.8399,\ A\ =\ -7.9792\ x\ 10\text{-}3}$ and B" should read
--$R = -11.8399$, $A = -7.9792 \times 10^{-3}$ and B--.

COLUMN 21:

Line 14, "is" should read --are--.

UNITED STATES PATENT AND TRADEMARK OFFICE
CERTIFICATE OF CORRECTION

PATENT NO. : 5,270,851
DATED : December 14, 1993
INVENTOR(S) : JUN MAKINO, ET AL.

It is certified that error appears in the above-indentified patent and that said Letters Patent is hereby corrected as shown below:

<u>COLUMN 22:</u>

Line 53, "scan-" should read --for scan- --.

<u>COLUMN 23:</u>

Line 51, "element" should read --elements--.

<u>COLUMN 24:</u>

Line 31, "$\delta c$:" should read --$\lambda c$:--; and
Line 32, "$\delta f$:" should read --$\lambda f$:--; and Signed and Sealed this Sixteenth Day of August, 1994

Attest:

BRUCE LEHMAN

*Attesting Officer*   *Commissioner of Patents and Trademarks*